(12) United States Patent
Andrews et al.

(10) Patent No.: US 6,487,665 B1
(45) Date of Patent: Nov. 26, 2002

(54) OBJECT SECURITY BOUNDARIES

(75) Inventors: Anthony D. Andrews, Redmond, WA (US); Satish R. Thatte, Redmond, WA (US); Richard D. Hill, Bellevue, WA (US); Rebecca A. Norlander, Seattle, WA (US); Alexander A. Armanasu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/201,060

(22) Filed: Nov. 30, 1998

(51) Int. Cl.[7] ............................ G06F 11/30; G06F 7/00; G06F 15/16; H04K 3/00
(52) U.S. Cl. ............................ 713/201; 380/4; 380/3; 707/103; 709/229
(58) Field of Search ........................ 713/200, 201, 713/202; 707/103; 709/3, 5, 229; 380/3, 4

(56) References Cited

U.S. PATENT DOCUMENTS

| | | |
|---|---|---|
| 4,752,928 A | 6/1988 | Chapman et al. |
| 4,807,111 A | 2/1989 | Cohen et al. |
| 5,016,166 A | 5/1991 | Van Loo et al. |
| 5,075,848 A | 12/1991 | Lai et al. |
| 5,093,914 A | 3/1992 | Coplien et al. |
| 5,125,091 A | 6/1992 | Staas, Jr. et al. |
| 5,133,075 A | 7/1992 | Risch |
| 5,151,987 A | 9/1992 | Abraham et al. |
| 5,168,441 A | 12/1992 | Onarheim et al. |
| 5,179,702 A | 1/1993 | Spix et al. |
| 5,181,162 A | 1/1993 | Smith et al. |
| 5,210,874 A | 5/1993 | Karger |
| 5,212,793 A | 5/1993 | Donica et al. |
| 5,247,675 A | 9/1993 | Farrell et al. |
| 5,313,638 A | 5/1994 | Ogle et al. |
| 5,315,703 A | 5/1994 | Matheny et al. |
| 5,339,415 A | 8/1994 | Strout, II et al. |
| 5,421,013 A | 5/1995 | Smith |
| 5,434,975 A | 7/1995 | Allen |
| 5,442,791 A | 8/1995 | Wrabetz et al. |
| 5,455,953 A | 10/1995 | Russell |
| 5,459,837 A | 10/1995 | Caccavale |
| 5,463,625 A | 10/1995 | Yasrebi |
| 5,481,715 A | 1/1996 | Hamilton et al. ............ 395/700 |
| 5,485,617 A | 1/1996 | Stutz et al. |
| 5,493,728 A | 2/1996 | Solton et al. |
| 5,504,898 A | 4/1996 | Klein |

(List continued on next page.)

FOREIGN PATENT DOCUMENTS

| | | |
|---|---|---|
| EP | 0559100 A2 | 2/1993 |
| EP | 0638863 A1 | 8/1994 |
| EP | 0777178 A1 | 4/1997 |

OTHER PUBLICATIONS

U.S. patent application Ser. No. 09/197,226, Hunt, filed Nov. 20, 1998.

(List continued on next page.)

*Primary Examiner*—Norman M. Wright
(74) *Attorney, Agent, or Firm*—Klarquist Sparkman, LLP

(57) ABSTRACT

An object-based security framework provides for intra-process security boundaries. An application developer can define security settings declaratively at the object, interface, and method level using a graphical interface. When the application is deployed, the settings are placed into a central store and can be modified at a later time. At runtime, logic outside the application objects enforces the security boundaries, relieving the developer of having to incorporate security logic into the application. Changes to the security can be implemented by changing the settings without having to change the application objects. In addition to checking for identity, the security framework supports roles and enforces specified authentication levels. The integrity of an application's security scheme is retained when the application is combined with another application in the framework.

24 Claims, 16 Drawing Sheets

U.S. PATENT DOCUMENTS

| | | | |
|---|---|---|---|
| 5,519,867 A | 5/1996 | Moeller et al. | |
| 5,524,238 A | 6/1996 | Miller et al. | |
| 5,555,368 A | 9/1996 | Orton et al. | |
| 5,555,388 A | 9/1996 | Shaughnessy | |
| 5,560,029 A | 9/1996 | Papadopoulos et al. | |
| 5,574,862 A | 11/1996 | Marianetti, II | |
| 5,574,918 A | 11/1996 | Hurley et al. | |
| 5,577,251 A | 11/1996 | Hamilton et al. | 395/942.07 |
| 5,577,252 A | 11/1996 | Nelson et al. | 395/670 |
| 5,579,520 A | 11/1996 | Bennett | |
| 5,581,760 A | 12/1996 | Atkinson et al. | |
| 5,598,562 A | 1/1997 | Cutler et al. | |
| 5,603,063 A | 2/1997 | Au | |
| 5,630,136 A | 5/1997 | Davidson et al. | |
| 5,675,796 A | 10/1997 | Hodges et al. | |
| 5,687,370 A | 11/1997 | Garst et al. | |
| 5,689,708 A | 11/1997 | Regnier et al. | 395/682 |
| 5,717,439 A | 2/1998 | Levine et al. | |
| 5,742,822 A | 4/1998 | Motomura | |
| 5,752,038 A | 5/1998 | Blake et al. | |
| 5,758,281 A | 5/1998 | Emery et al. | |
| 5,764,747 A | 6/1998 | Yue et al. | |
| 5,764,918 A | 6/1998 | Poulter | |
| 5,765,174 A | 6/1998 | Bishop | |
| 5,768,348 A | 6/1998 | Solomon et al. | |
| 5,778,365 A | 7/1998 | Nishiyama | |
| 5,787,281 A | 7/1998 | Schreiber et al. | |
| 5,790,789 A | 8/1998 | Suarez | |
| 5,794,038 A | 8/1998 | Stutz et al. | |
| 5,802,291 A | 9/1998 | Balick et al. | |
| 5,815,665 A | 9/1998 | Teper et al. | |
| 5,822,435 A | 10/1998 | Boebert et al. | 380/49 |
| 5,832,274 A | 11/1998 | Cutler et al. | 395/712 |
| 5,838,916 A | 11/1998 | Domenikos et al. | 395/200.49 |
| 5,864,683 A | 1/1999 | Boebert et al. | |
| 5,881,225 A | 3/1999 | Worth | |
| 5,884,316 A | 3/1999 | Bernstein et al. | |
| 5,889,942 A | 3/1999 | Orenshteyn | |
| 5,890,161 A | 3/1999 | Helland et al. | 703/103 |
| 5,907,675 A | 5/1999 | Aahlad | |
| 5,941,947 A | 8/1999 | Brown et al. | |
| 5,958,010 A | 9/1999 | Agarwal et al. | |
| 6,014,666 A | 1/2000 | Helland et al. | |
| 6,026,428 A | 2/2000 | Hutchison et al. | |
| 6,061,796 A | 5/2000 | Chen et al. | |
| 6,105,147 A | 8/2000 | Molloy | |
| 6,134,594 A | 10/2000 | Helland et al. | |
| 6,167,423 A | 12/2000 | Chopra et al. | |
| 6,173,404 B1 * | 1/2001 | Colburn et al. | 713/200 |
| 6,182,108 B1 | 1/2001 | Williams et al. | |

OTHER PUBLICATIONS

U.S. patent application Ser. No. 09/135,397, Thatte et al., filed Aug. 17, 1998.

U.S. patent application Ser. No. 09/135,106, Al–Ghosien et al., filed Aug. 17, 1998.

U.S. patent application Ser. No. 09/197,080, Hunt, filed Nov. 20, 1998.

U.S. patent application Ser. No. 09/197,211, Hunt, filed Nov. 20, 1998.

U.S. patent application Ser. No. 09/196,836, Hunt, filed Nov. 20, 1998.

U.S. patent application Ser. No. 09/197,009, Hunt, filed Nov. 20, 1998.

U.S. patent application Ser. No. 09/197,246, Hunt, filed Nov. 20, 1998.

U.S. patent application Ser. No. 09/197,242, Hunt, filed Nov. 20, 1998.

U.S. patent application Ser. No. 09/196,974, Hunt, filed Nov. 20, 1998.

U.S. patent application Ser. No. 09/328,683, Williams et al., Jun. 08, 1999.

R. W. Baldwin. Naming and Grouping Privileges to Simplify Security Management in Large Databases. In Proceedings of the 1990 IEEE Symposium on Security and Privacy, pp. 116–132, May 1990.

Nyanchama, M., Osborn, S. (1994) Access Rights Administration in Role–Based Security Systems. Proc. IFIP WG 11.3 Database Security, 1994. In: Database Security VIII, Status and Prospects (J. Biskup, M. Morgenstern, C. E. Landwehr, Eds). North Holland (Elsevier) (pp. 1–23).

Moffett J.D., Sloman M.S. & Twidle K.P. (1990), Specifying Discretionary Access Control Policy for Distributed Systems, Computer Communications, vol. 13 No. 9 (Nov. 1990) pp 571–580.

U.S. National Institute of Standards and Technology. Federal information processing standards publication 140–1: Security requirements for cryptographic modules, Jan. 1994 (pp. 1–53).

Jonathan D. Moffett. Specification of Management Policies and Discretionary Access Control. In M. S. Sloman, editor, Network and Distributed Systems Management, chapter 18, pp. 18–1 through 18–21. Addison–Wesley, 1994.

Sloman, M., and J. Moffett. "Managing Distributed Systems", Domino Project Report, Imperial College, U.K. Sep. 1989 (pp. 1–23).

G. Wiederhold: Mediators in the Architecture of Future Information Systems. IEEE Computer, 25(3), 1992 (36 pages).

M. S. Sloman, Policy Driven Management for Distributed Systems. Journal of Network and Systems Management, 2(4): 333–360, Plenum Press Publishing, 1994 (22 pages in a downloaded format).

Jonathan D. Moffett, Morris S. Sloman. Policy Hierarchies for Distributed Systems Management. IEEE Journal on Selected Areas in Communications, Special Issue on Network Management, 11(9):1404–1414, Dec. 1993 (22 pages in downloaded format).

Scott A. Gile. Reporting Application Usage in a LAN Environment, New Centerings in Computing Services, pp. 147–159 (1990).

Moffett J.D. & Sloman M.S. (1991b), The Representation of Policies as System Objects, Proceedings of the Conference on Organisational Computer Systems (COCS'91) Atlanta, GA, Nov. 5–8, 1991, in SIGOIS Bulletin vol. 12, Nos. 2 & 3, pp 171–184 (16 pages in downloaded format).

Bochenski, *IBM's SystemView*, Computer Technology Research Corp., pp. 1–27, 29–65, 67–79, 81–91, 93–103, 105–115, 117–139, 141–143, 1991.

Franklin, "Concurrency Control and Recovery," *The Computer Science and Engineering Handbook*, Tucker, Jr. (ed.), pp. 1058–1077, 1996.

*Java Remote Method Invocation*, http://java.sun.com/products/jdk/1.2/docs/guide/rmi/spec/rmiTOC.doc.html, pp. 1–3, Dec. 1997.

"Introduction," *Java Remote Method Invocation*, http://java-.sun.com/products/jdk/1.2/docs/guide/rmi/spec/rmi–intro-.doc.html, p. 1, Dec. 1997.

"Overview," *Java Remote Method Invocation*, http://java.sun.com/products/jdk/1.2/docs/guide/rmi/spec/rmi–intro.doc1.html, p. 1, Dec. 1997.

"System Goals," *Java Remote Method Invocation*, http://java.sun.com/products/jdk/1.2/docs/guide/rmi/spec/rmi–intro.doc2.html, p. 1, Dec. 1997.

"Java Distributed Object Model," *Java Remote Method Invocation*, http://java.sun.com/products/jdk/1.2/docs/guide/rmi/spec/rmi–objmodel.doc.html, p. 1, Dec. 1997.

"Definition of Terms," *Java Remote Method Invocation*, http://java.sun.com/products/jdk/1.2/docs/guide/rmi/spec/rmi–objmodel.doc1.html, p. 1, Dec. 1997.

"The Distributed and Nondistributed Models Contrasted," *Java Remote Method Invocation*, http://java.sun.com/products/jdk/1.2/docs/guide/rmi/spec/rmi–objmodel.doc2.html, p. 1, Dec. 1997.

"RMI Interfaces and Classes," *Java Remote Method Invocation*, http;//java.sun.com/products/jdk/1.2/docs/guide/rmi/spec/rmi–objmodel.doc3.html, pp. 1–2, Dec. 1997.

"Implementing a Remote Interface," *Java Remote Method Invocation*, http://java.sun.com/products/jdk/1.2/docs/guide/rmi/spec/rmi–objmodel.doc4.html, pp. 1–2 Dec. 1997.

"Type Equivalency of Remote Objects with Local Stub," *Java Remote Method Invocation*, http://java.sun.com/products/jdk/1.2/docs/guide/rmi/spec/rmi–objmodel.doc5.html, p. 1, Dec. 1997.

"Parameter Passing in Remote Method Invocation," *Java Remote Method Invocation*, http://java.sun.com/products/jdk/1.2/docs/guide/rmi/spec/rmi–objmodel.doc6.html, p. 1, Dec. 1997.

"Exception Handling in Remote Method Invocation," *Java Remote Method Invocation*, http://java.sun.com/products/jdk/1.2/docs/guide/rmi/spec/rmi–objmodel.doc7.html, p. 1, Dec. 1997.

"Object Methods Overridden by the RemoteObject Class," *Java Remote Method Invocation*, http:/java.sun.com/products/jdk/1.2/docs/guide/rmi/spec/rmi–objmodel.doc8.html, pp. 1–2, Dec. 1997.

"The Semantics of Object Methods Declared Final," *Java Remote Method Invocation*, http://java.sun.com/proudcts/jdk/1.2/docs/guide/rmi/spec/rmi–objmodel.doc9.html, p. 1, Dec. 1997.

"Locating Remote Objects," *Java Remote Method Invocation*, http://java.sun.com/products/jdk/1.2/docs/guide/rmi/spec/rmi–objmodel.doc10.html, p. 1, Dec. 1997.

"System Architecture," *Java Remote Method Invocation*, http://java.sun.com/products/jdk/1.2/docs/guide/rmi/spec/rmi–arch.doc.html, p. 1, Dec. 1997.

"Overview," *Java Remote Method Invocation*, http://java.sun.com/products/jdk/1.2/docs/guide/rmi/spec/rmi–arch.doc1.html, p. 1, Dec. 1997.

"Architectural Overview," *Java Remote Method Invocation*, http://java.sun.com/products/jdk/1.2/docs/guide/rmi/spec/rmi–arch.doc2.html, pp. 1–2, Dec. 1997.

"The Stub/Skeleton Layer," *Java Remote Method Invocation*, http://java.sun.com/products/jdk/1.2/docs/guide/rmi/spec/rmi–arch.doc3.html, p. 1, Dec. 1997.

"The Remote Reference Layer," *Java Remote Method Invocation*, http://java.sun.com/products/jdk/1.2/docs/guide/rmi/spec/rmi–arch.doc4.html, p. 1, Dec. 1997.

"The Transport Layer," *Java Remote Method Invocation*, http://java.sun.com/products/jdk/1.2/docs/guide/rmi/spec/rmi–arch.doc5.html, pp. 1–2, Dec. 1997.

"Thread Usage in Remote Method Invocations," *Java Remote Method Invocation*, http://java.sun.com/products/jdk/1.2/docs/guide/rmi/spec/rmi–arch.doc6.html, p. 1, Dec. 1997.

"Garbage Collection of Remote Objects," *Java Remote Method Invocation*, http://java.sun.com/products/jdk/1.2/docs/guide/rmi/spec/rmi–arch.doc7.html, pp. 1–2, Dec. 1997.

"Dynamic Class Loading," *Java Remote Method Invocation*, http://java.sun.com/products/jdk/1.2/docs/guide/rmi/spec/rmi–arch.doc8.html, pp. 1–4, Dec. 1997.

"Security," *Java Remote Method Invocation*, http://java.sun.com/products/jdk/1.2/docs/guide/rmi/spec/rmi–arch.doc9.html, pp. 1–2, Dec. 1997.

"Configuration Scenarios," *Java Remote Method Invocation*, http://java.sun.com./products/jdk/1.2/docs/guide/rmi/spec/rmi–arch.doc10.html, pp. 1–2, Dec. 1997.

"RMI Through Firewalls Via Proxies," *Java Remote Method Invocation*, http://java.sun.com/products/jdk/1.2/docs/guide/rmi/spec/rmi–arch.doc11.html, pp. 1–3, Dec. 1997.

"Client Interfaces," *Java Remote Method Invocation*, http://java.sun.com/products/jdk/1.2/docs/guide/rmi/spec/rmi–client.doc.html, p. 1, Dec. 1997.

"The Remote Interface," *Java Remote Method Invocation*, http://java.sun.com/products/jdk/1.2/docs/guide/rmi/spec/rmi–client.doc1.html, p. 1, Dec. 1997.

"The RemoteException Class," *Java Remote Method Invocation*, http://java.sun.com/products/jdk/1.2/docs/guide/rmi/spec/rmi–client.doc2.html, p. 1, Dec. 1997.

"The Naming Class," *Java Remote Method Invocation*, http://java.sun.com/products/jdk/1.2/docs/guide/rmi/spec/rmi–client.doc3.html, pp. 1–2, Dec. 1997.

"Server Interfaces," *Java Remote Method Invocation*, http://java.sun.com/products/jdk/1.2/docs/guide/rmi/spec/rmi–server.doc.html, p. 1, Dec. 1997.

"The RemoteObject Class," *Java Remote Method Invocation*, http://java.sun.com/products/jdk/1.2/docs/guide/rmi/spec/rmi–server.doc1.html, pp. 1–2, Dec. 1997.

"The RemoteServer Class," *Java Remote Method Invocation*, http://java.sun.com/products/jdk/1.2/docs/guide/rmi/spec/rmi–server.doc2.html, pp. 1–2, Dec. 1997.

"The SocketType Class," *Java Remote Method Invocation*, http://java.sun.com/products/jdk/1.2/docs/guide/rmi/spec/rmi–server.doc3.html, pp. 1–4, Dec. 1997.

"The UnicastRemoteObject Class," *Java Remote Method Invocation*, http://java.sun.com/products/jdk/1.2/docs/guide/rmi/spec/rmi–server.doc4.html, pp. 1–3, Dec. 1997.

"The Unreferenced Interface," *Java Remote Method Invocation*, http://java.sun.com/products/jdk/1.2/docs/guide/rmi/spec/rmi–server.doc5.html, p. 1, Dec. 1997.

"The RMISecurityManager Class," *Java Remote Method Invocation*, http://java.sun.com/products/jdk/1.2/docs/guide/rmi/spec/rmi–server.doc6.html, pp. 1–5, Dec. 1997.

"The RMIClassLoader Class," *Java Remote Method Invocation*, http://java.sun.com/products/jdk/1.2/docs/guide/rmi/spec/rmi–server.doc7.html, pp. 1–2, Dec. 1997.

"The LoaderHandler Interface," *Java Remote Method Invocation*, http://java.sun.com/products/jdk/1.2/docs/guide/rmi/spec/rmi–server.doc8.html, p. 1, Dec. 1997.

"The RMISocketFactory Class," *Java Remote Method Invocation*, http://java.sun.com/products/jdk/1.2/docs/guide/rmi/spec/rmi–server.doc9.html, pp. 1–2, Dec. 1997.

"The RMISocketFailureHandler Interface," *Java Remote Method Invocation*, http://java.sun.com/products/jdk/1.2/docs/guide/rmi/spec/rmi–server.doc10.html, p. 1, Dec. 1997.
"The LogStream Class," *Java Remote Method Invocation*, http://java.sun.com/products/jdk/1.2/docs/guide/rmi/spec/rmi–server.doc11.html, pp. 1–2, Dec. 1997.
"Stub and Skeleton Compiler," *Java Remote Method Invocation*, http://java.sun.com/products/jdk/1.2/docs/guide/rmi/spec/rmi–server.doc12.html, p. 1, Dec. 1997.
"Registry Interfaces," *Java Remote Method Invocation*, http://java.sun.com/products/jdk/1.2/docs/guide/rmi/spec/rmi–registry.doc.html, p. 1, Dec. 1997.
"The Registry Interface," *Java Remote Method Invocation*, http://java.sun.com/products/jdk/1.2/docs/guide/rmi/spec/rmi–registry.doc1. html, pp. 1–2, Dec. 1997.
"The LocateRegistry Class," *Java Remote Method Invocation*, http://java.sun.com/products/jdk/1.2/docs/guide/rmi/spec/rmi–registry.doc2.html, pp. 1–2, Dec. 1997.
"The RegistryHandler Interface," *Java Remote Method Invocation*, http://java.sun.com/products/jdk/1.2/docs/guide/rmi/spec/rmi–registry.doc3.html, p. 1, Dec. 1997.
"Remote Object Activation," *Java Remote Method Invocation*, http://java.sun.com/products/jdk/1.2/docs/guide/rmi/spec/rmi–activation.doc.html, p. 1, Dec. 1997.
"Overview," *Java Remote Method Invocation*, http://java.sun.com/products/jdk/1.2/docs/guide/rmi/spec/rmi–activation.doc1.html, pp. 1–2, Dec. 1997.
"Activation Protocol," *Java Remote Method Invocation*, http://java.sun.com/products/jdk/1.2/docs/guide/rmi/spec/rmi–activation.doc2.html, pp. 1–2, Dec. 1997.
"Implementation Model for an "Activatable" Remote Object," *Java Remote Method Invocation*, http://java.sun.com/products/jdk/1.2/docs/guide/rmi/spec/rmi–activation.doc3.html, pp. 1–2, Dec. 1997.
"Activation Interfaces," *Java Remote Method Invocation*, http://java.sun.com/products/jdk/1.2/docs/guide/rmi/spec/rmi–activation.doc4.html, pp. 1–14, Dec. 1997.
"Stub/Skeleton Interfaces," *Java Remote Method Invocation*, http://java.sun.com/products/jdk/1.2/docs/guide/rmi/spec/rmi–stubs.doc.html, p. 1, Dec. 1997.
"The RemoteStub Class," *Java Remote Method Invocation*, http://java.sun.com/products/jdk/1.2/docs/guide/rmi/spec/rmi–stubs.doc1.html, p. 1, Dec. 1997.
"The RemoteCall Interface," *Java Remote Method Invocation*, http://java.sun.com/products/jdk/1.2/docs/guide/rmi/spec/rmi–stubs.doc2.html, pp. 1–2, Dec. 1997.
"The RemoteRef Interface," *Java Remote Method Invocation*, http://java.sun.com/products/jdk/1.2/docs/guide/rmi/spec/rmi–stubs.doc3.html, pp. 1–2, Dec. 1997.
"The ServerRef Interface," *Java Remote Method Invocation*, http://java.sun.com/products/jdk/1.2/docs/guide/rmi/spec/rmi–stubs.doc4.html, p. 1, Dec. 1997.
"The Skeleton Interface," *Java Remote Method Invocation*, http://java.sun.com/products/jdk/1.2/docs/guide/rmi/spec/rmi–stubs.doc5.html, p. 1, Dec. 1997.
"The Operation Class," *Java Remote Method Invocation*, http://java.sun.com/products/jdk/1.2/docs/guide/rmi/spec/rmi–stubs.doc6.html, p. 1, Dec. 1997.
"Garbage Collector Interfaces," *Java Remote Method Invocation*, http://java.sun.com/products/jdk/1.2/docs/guide/rmi/spec/rmi–dgc.doc.html, p. 1, Dec. 1997.
"The Interface DGC," *Java Remote Method Invocation*, http://java.sun.com/products/jdk/1.2/docs/guide/rmi/spec/rmi–dgc.doc1.html, pp. 1–2, Dec. 1997.
"The Lease Class," *Java Remote Method Invocation*, http://java.sun.com/products/jdk/1.2/docs/guide/rmi/spec/rmi–dgc.doc2. html, p. 1, Dec. 1997.
"The ObjID Class," *Java Remote Method Invocation*, http://java.sun.com/products/jdk/1.2/docs/guide/rmi/spec/rmi–dgc.doc3.html, pp. 1–2, Dec. 1997.
"The UID Class," *Java Remote Method Invocation*, http://java.sun.com/products/jdk/1.2/docs/guide/rmi/spec/rmi–dgc.doc4.html, pp. 1–2, Dec. 1997.
"The VMID Class," *Java Remote Method Invocation*, http://java.sun.com/products/jdk/1.2/docs/guide/rmi/spec/rmi–dgc.doc5.html, pp. 1–2, Dec. 1997.
"RMI Wire Protocol," *Java Remote Method Invocation*, http://java.sun.com/products/jdk/1.2/docs/guide/rmi/spec/rmi–protocol.doc.html, p. 1, Dec. 1997.
"Overview," *Java Remote Method Invocation*, http://java.sun.com/products/jdk/1.2/docs/guide/rmi/spec/rmi–protocol.doc1.html, p. 1, Dec. 1997.
"RMI Transport Protocol," *Java Remote Method Invocation*, http://java.sun.com/products/jdk/1.2/docs/guide/rmi/spec/rmi–protocol.doc2.html, pp. 1–3, Dec. 1997.
"RMI's Use of Object Serialization Protocol," *Java Remote Method Invocation*, http://java.sun.com/products/jdk/1.2/docs/guide/rmi/spec/rmi–protocol.doc3.html, pp. 1–2, Dec. 1997.
"RMI's Use of HTTP POST Protocol," *Java Remote Method Invocation*, http://java.sun.com/products/jdk/1.2/docs/guide/rmi/spec/rmi–protocol.doc4.html, p. 1, Dec. 1997.
"Application Specific Values for RMI," *Java Remote Method Invocation*, http://java.sun.com/products/jdk/1.2/docs/guide/rmi/spec/rmi–protocol.doc5.html, p. 1, Dec. 1997.
"RMI's Multiplexing Protocol," *Java Remote Method Invocaton*, http://java.sun.com/products/jdk/1.2/docs/guide/rmi/spec/rmi–protocol.doc6.html, pp. 1–6, Dec. 1997.
"Exceptions During Remote Object Export," *Java Remote Method Invocation*, http://java.sun.com/products/jdk/1.2/docs/guide/rmi/spec/rmi–exceptions.doc1.html, pp. 1–2, Dec. 1997.
"Exceptions During RMI Call," *Java Remote Method Invocation*, http://java.sun.com/products/jdk/1.2/docs/guide/rmi/spec/rmi–exceptions.doc2.html, p. 1, Dec. 1997.
"Possible Causes of java.rmi.ServerException," *Java Remote Method Invocation*, http://java.sun.com/products/jdk/1.2/docs/guide/rmi/spec/rmi–exceptions.doc4.html, p. 1, Dec. 1997.
"Naming Exceptions," *Java Remote Method Invocation*, http://java.sun.com/products/jdk/1.2/docs/guide/rmi/spec/rmi–exceptions.doc5.html, p. 1, Dec. 1997.
"Other Exceptions," *Java Remote Method Invocation*, http://java.sun.com/products/jdk/1.2/docs/guide/rmi/spec/rmi–exceptions.doc6.html, p. 1, Dec. 1997.
"Properties in RMI," *Java Remote Method Invocation*, http://java.sun.com/products/jdk/1.2/docs/guide/rmi/spec/rmi–properties.doc.html, p. 1, Dec. 1997.
"Server Properties," *Java Remote Method Invocation*, http://java.sun.com/products/jdk/1.2/docs/guide/rmi/spec/rmi–properties.doc1.html, p. 1, Dec. 1997.
"Activation Properties," *Java Remote Method Invocation*, http://java.sun.com/products/jdk/1.2/docs/guide/rmi/spec/rmi–properties.doc2.html, p. 1, Dec. 1997.

"Other Properties," *Java Remote Method Invocation*, http://java.sun.com/products/jdk/1.2/docs/guide/rmi/spec/rmi–properties.doc3.html, p. 1, Dec. 1997.

Kiczales, *Aspect–Oriented–Programming*, http://www-.parc.xerox.com/spl/projects/aop/invited–talk, 86 pp. 1997.

Mens et al., "Aspect–Oriented Programming Workshop Report," *Proceedings of the Aspect–Oriented Programming Workshop at ECOOP '97*, 14 pp., 1997.

Aksit, "Issues in Aspect–Oriented Software Development," *Proceedings of the Aspect–Oriented Programming Workshop at ECOOP '97*, 7 pp., 1997.

Czarnecki et al., "Beyond Objects: Generative Programming," *Proceedings of the Aspect–Oriented Programming Workshop at ECOOP '97*, 8 pp., 1997.

De Meuter, "Monads as a Theoretical Foundation for AOP," *Proceedings of the Aspect–Oriented Programming Workshop at ECOOP '97*, 6 pp., 1997.

Dempsey et al., "Aspects of System Support for Distributed Computing," *Proceedings of the Aspect–Oriented Programming Workshop at ECOOP '97*, 6 pp., 1997.

Hernández et al., "Coordinating Concurrent Objects: How to Deal with the Coordination Aspect?," *Proceedings of the Aspect–Oriented Programming Workshop at ECOOP '97*, 6 pp., 1997.

Holmes et al., "Aspects of Synchronisation," *Proceedings of the Aspect–Oriented Programming Workshop at ECOOP '97*, 6 pp., 1997.

Lamping, "The Interaction of Components and Aspects," *Proceedings of the Aspect Oriented Programming Workshop at ECOOP '97*, 1 pp., 1997.

Matthijs et al., "Aspects Should Not Die," *Proceedings of the Aspect–Oriented Programming Workshop at ECOOP '97*, 5 pp., 1997.

Müller, "draft: Aspect–Design in the Building–Block Method," *Proceedings of the Aspect–Oriented Programming Workshop at ECOOP '97*, 3 pp., 1997.

Harrison et al., "The Beginnings of a Graphical Environment for Subject–Oriented Programming," *Proceedings of the Aspect–Oriented Programming Workshop at ECOOP '97*, 2 pp., 1997.

Thorup, "Contextual Class Extensions," *Proceedings of the Aspect–Oriented Programming Workshop at ECOOP '97*, 7 pp., 1997.

VanHilst, "Subcomponent Decomposition as a Form of Aspect Oriented Programming," *Proceedings of the Aspect–Oriented Programming Workshop at ECOOP '97*, 2 pp., 1997.

Van Roy et al., "Using Mobility to Make Transparent Distribution Practical," *Proceedings of the Aspect–Oriented Programming Workshop at ECOOP '97*, 18 pp., 1997.

Werner, "Email Thoughts," *Proceedings of the Aspect–Oriented Programming Workshop at ECOOP '97*, 1 pp., 1997.

Hamilton (ed.), "Events," *JavaBeans*, Sun Microsystems, pp. 24–39, 1996.

Black, "Scheduling Support for Concurrency and Parallelism in the Mach Operating System," *Computer*, pp. 35–43, May 1990.

King, "The Base System," *Inside Windows 95*, Microsoft Press, pp. 103–150, 1994.

Abadi et al., *A Calculus for Access Control in Distributed Systems*, Digital Equipment Corporation, pp. 1–44, 1991.

Abadi et al., *Baby Modula–3 and a Theory of Objects*, Digital Equipment Corporation, pp. 1–36, 1993.

Birrell et al., *Synchronization Primitives for a Multiprocessor: A Formal Specification*, SRC Research Report 20, pp. 1–20, 1987.

Birrell, *An Introduction to Programming with Threads*, Digital Equipment Corporation, pp. 1–33, 1989.

Burstall et al., *A Kernel Language for Modules and Abstract Data Types*, Digital Equipment Corporation, pp. 1–51, 1984.

Cardelli, *A Polymorphic λ–calculus with Type:Type*, Digital Equipment Corporation, pp. 1–27, 1986.

Cardelli et al., *Modula–3 Report (revised)*, Digital Equipment Corporation, pp. 1–61, 63, 65–71, and Appendix (*Twelve Changes to Modula–3, Dec. 19, 1990*, pp. 1–15), 1989.

DeTreville, *Experience with Concurrent Garbage Collectors for Modula–2+*, Digital Equipment Corporation, pp. 1–58, 1990.

Ellis et al., *Real–time Concurrent Collection on Stock Multiprocessors*, Digital Equipment Corporation, pp. 1–25, 1988.

Horning et al., *Some Useful Modula–3 Interfaces*, Digital Equipment Corporation, pp. 1–103, 1993.

Lamport, *A Fast Mutual Exclusion Algorithm*, Digital Equipment Corporation, pp. 1–12, 1988.

Lamport, *A Simple Approach to Specifying Concurrent Systems*, Digital Equipment Corporation, pp. 1–39, 1986, 1988.

Lamport, *Concurrent Reading and Writing of Clocks*, Digital Equipment Corporation, pp. 1–7, 1988.

Lamport, *How to Make a Correct Multiprocess Program Execute Correctly on a Multiprocessor*, Digital Equipment Corporation, pp. 1–10, 1993.

Lamport, *On Interprocess Communication*, Digital Equipment Corporation, pp. 1–50, 1985.

Lamport, *win and sin: Predicate Transformers for Currency*, Digital Equipment Corporation, pp. 1–43, 1988.

McJones et al., *Evolving the UNIX System Interface to Support Multithreaded Programs*, Digital Equipment Corporation, pp. 1–80, 1987.

Nelson, *A Generalization of Dijkstra's Calculus*, Digital Equipment Corporation, pp. 1–56, 1986.

Owicki, *Experience with the Firefly Multiprocessor Workstation*, Digital Equipment Corporation, pp. 1–15, 17–20, 1989.

Roberts et al., *WorkCrews: An Abstraction for Controlling Parallelism*, Digital Equipment Corporation, pp. 1–15, 17–19, 1989.

Rovner et al., *On Extending Modula–2 For Building Large, Integrated System*, Digital Equipment Corporation, pp. 1–45, 1985.

Schroeder et al., *Performance of Firefly RPC*, Digital Equipment Corporation, pp. 1–15, 1989.

Thacker et al., *Firefly: A Multiprocessor Workstation*, Digital Equipment Corporation pp. 1–13, 15, and 17–18, 1987.

Bruce, "The Treatment of State in Optimistic Systems," *IEEE*, pp. 40–49, Jun. 1995.

"CORBA Overview," *The Common Object Request Broker: Architecture and Specification*, Revision 2.0, pp. 2–1 through 2–17, Jul. 1995.

*The Common Object Request Broker: Architecture and Specification*, Revision 2.0, pp. 4–12 through 4–16, Jul. 1995.

Steinman, "Incremental State Saving in Speedes Using C++," *Proceedings of the 1993 Winter Simulation Conference*, pp. 687–696, 1993.

Limprecht, "Microsoft Transaction Server," *Compcon '97, Proceedings, IEEE*, pp. 14–18, Feb. 1997.

Franklin, "Concurrency Control and Recovery," *the Computer Science and Engineering Handbook*, Tucker (ed.), CRC Press, pp. 1058–1077, 1997.

Wills, "Process Synchronization and Interprocess Communication," *The Computer Science and Engineering Handbook*, Tucker (ed.), CRC Press, pp. 1725–1746, 1997.

*Object Transaction Service*, OMG Document 94.6.1, pp. 1–102, 1994.

Chappell, "The Microsoft Transaction Server (MTS): Transactions Meet Components," http://www.microsoft.com/Com/wpaper/mtscomp.asp, pp. 1–17, 1997.

Bowen, "Intel's Middleware Move," *InfoWorld*, pp. 1–2, 1998.

Broy, *Can Fair Choice be Added to Dijkstra's Calculus*?, Digital Equipment Corporation, pp. 1–19, 1989.

U.S. patent application Ser. No. 9071594, Fox et al., filed May 1998.

"Single–threaded Apartments," microsoft.com website, pp. 1–2, May 26, 1998.

"Using Secure RPC," MSDN Library CD, pp. 1–7, Apr. 1998.

"FAQ:COM Security Frequently Asked Questions," MSDN Library CD, pp. 1–10, Apr. 1998.

"Using DCOM Security," MSDN Library CD, pp. 1–5, Apr. 1998.

*Comparing Microsoft Transaction Server to Enterprise JavaBeans: White Paper*, pp. 1–15, Jul. 1998.

Brown et al., "Distributed Component Object Model Protocol—DCOM/1.0," http://globecom.net/ietf/draft/draft–brown–dcom–vl–spec–03.html, pp. 1–52, Jan. 1998.

Asche, "Windows NT Security in Theory and Practice," Microsoft Developer Network CD, pp. 1–12, Jul. 1996.

"CoInitializeSecurity," Microsoft Developer Network CD, pp. 1–2, Jul. 1996.

"Security and Scalability," Microsoft Developer Network CD, p. 1, Jul. 1996.

"RPC_C_IMP_LEVEL_xxx," Microsoft Developer Network CD, p. 1, Jul. 1996.

"RPC_C_AUTHN_xxx," Microsoft Developer Network CD, p. 1 Jul. 1996.

"CoRegisterAuthenticationServices," Microsoft Developer Network CD, p. 1, Jul. 1996.

Brockschmidt, "Chapter Six, Local/Remote Transparency," *Inside Ole*, 2d Ed., pp. 277–338 (1995).

Go, "Intranet load–balancing solutions: Balance on the back end," *Infoworld*, pp. 72–86 (Mar. 1998).

Horstmann et al., "DCOM Architecture," Microsoft Press, pp. 1–55 (Jul. 1997).

Lam, "Building Scalable Apps," *PC Magazine*, pp. 209–214 (Apr. 1998).

Microsoft, *Windows NT.Server*, Server Operating System, White Paper, DCOM Technical Overview, pp. 1–43 (Apr. 1998).

Nance, "Balance the Load with Transaction Server," *BYTE Magazine*, pp. 1–8 (Jun. 1997).

Orfali et al., "COM:OLE'Object Bus," *The Essential Distributed Objects Survival Guide*, Ch. 25, pp. 425–452 (1996).

Orfali et al., "CORBA Services; System Management and Security," *The Essential Distributed Objects Survival Guide*, Ch. 10, pp. 183–202 (1996).

Tomsen, "Virtually Crash–Proof Your Web Site with IIS 4.0," *Microsoft Interactive Developer*, 2:10, pp. 41–46 (Oct. 1997).

Nierstrasz, "Active Objects Hybrid," *Proceedings of OOPSLA 1987*, 22:12, pp. 243–253 Oct. 4–8 (Dec. 1987).

Orfali et al., Ch. 9, "RPC, Messaging, and Peer–to–Peer," *Essential Client/Server Survival Guide*, John Wiley & Sons, Inc., pp. 119–128 (1994).

"Chapter 9: Connectable Objects," pp. 1–12, http://www/microsoft.com/oledev/olecom/Ch09.htm (Jun. 22, 1998).

Hamilton (Ed.), "JavaBeans™" *Sun Microsystems*, Version 1.01, pp. 1–114 (Jul. 1997).

Hurwicz, "Multicast to the Masses: The IP Multicast standard is ready, but the infrastructure isn't. Yet.," *BYTE Magazine*, pp. 1–10 (Jun. 1997).

"Managing Performance/Reliability Trade–Offs,"*BYTE Magazine*, Reviews, pp. 1–2 (Feb. 1998).

"Monkey in the Middleware," *BYTE Magazine*, Reviews, pp. 1–2 (Feb. 1998).

Montgomery, "Distributing Components: For CORBA and DCOM it's time to get practical.," *BYTE Magazine*, Special Report, pp. 1–10 and illustrations "DCOM Architecture" and "CORBA Architecture" (Apr. 1997).

Skeen, "Enabling the Real–Time Enterprise," *BYTE Magazine*, Core Technologies, pp. 1–5 and illustrations "Reliable Multicast Protocol in Action" and "Multilevel Caching Over a WAN" (Jan. 1998).

Neumann, "Security and Privacy Issues in Computer and Communication Systems," Ch. 89, *The Computer Science and Engineering Handbook*, (Tucker, Ed.), pp. 1910–1913 (1997).

Landwehr, Protection (Security) Models and Policy, Ch. 90 *The Computer Science and Engineering Handbook*, (Tucker, Ed.), pp. 1914–1928 (1997).

Sandhu et al., "Authentication, Access Control, and Intrusion Detection," Ch. 91, *The Computer Science and Engineering Handbook*, (Tucker, Ed.), pp. 1929–1948 (1997).

Bellovin, "Network and Internet Security," Ch. 92, *The Computer Science and Engineering Handbook*, (Tucker, Ed.), pp. 1949–1961 (1997).

Jajodia, "Database Security and Privacy," Ch. 49, *The Computer Science and Engineering Handbook*, (Tucker, Ed.), pp. 1112–1124 (1997).

McKay, "Microsoft talks up tools" *InfoWorld*, 20:19, 2 pp. (May 11, 1998).

Matena et al., "Enterprise JavaBeans™," Version 1.0 Specification, *Sun Microsystems*, pp. 1–181 (Mar. 1998).

"The Component Object Model: Technical Overview," Microsoft Corporation, pp. 1–17, available at www.microsoft.com/com/wpaper/Com_modl.htm (1996).

Seetharaman, "The CORBA Connection," *Communications of the ACM* 41:10, pp. 34–36 (Oct. 1998).

Siegel, "OMG Overview: CORBA and the OMA in Enterprise Computing," *Communications of the ACM*, 41:10, pp. 37–43 (Oct. 1998).

Vinoski, "New Features for CORBA 3.0," *Communications of the ACM*, 41:10, pp. 44–52 (Oct. 1998).

Schmidt, "Evaluating Architectures for Multithreaded Object Request Brokers," *Communications of the ACM*, 41:10, pp. 54–60 (Oct. 1998).

Henning, "Binding, Migration, and Scalability in CORBA," *Communications of the ACM*, 41:10, pp. 62–71 (Oct. 1998).

Haggerty et al., "The benefits of CORBA–Based Network Management," *Communications of the ACM*, 41:10, pp. 73–79 (Oct. 1998).

Grimes, "Chapter 7: Security" *DCOM Programming*: A guide to creating practical applications with Microsoft's Distributed Component Object Model, pp. 319–389 (1997).

Schwartz, "Intel's middleware move: company ponders initiatives for common object services," *InfoWorld*, 20:9, p1(1), 2 pp. (Mar. 2, 1998).

Barkley, "Role Based Access Control (RBAC)," Software Diagnostics and Conformance Testing National Institute of Standards and Technology, 27 pp. (Mar. 1998).

Gavrila and Barkley, "Formal Specification for Role Based Access Control User/Role and Role/Role Relationship Management," 10 pp. (Oct. 1998).

Barkley, "Application Engineering in Health Care," pp. 1–7 (May 9, 1995).

Cugini and Ferraiolo, "Role Based Access Control Slide Set—May 1995," National Institute of Standards and Technology, 25 pp. (May 1995).

Smith, Sr. et al., "A Marketing Survey of Civil Federal Government Organizations to Determine the Need for a Role–Based Access Control (RBAC) Security Product," Seta Corporation, 84 pp. (Jul. 1996).

Ferraiolo and Barkley, "Specifying and Managing Role-–Based Access Control within a Corporate intranet," 6 pp. (1997).

Ferraiolo et al., "Role–Based Access Control (RBAC): Features and Motivations," 8 pp. (1995).

Kuhn, "Mutual Exclusion of Roles as a Means of Implementing Separation of Duty in Role–Based Access Control Systems," 8 pp. (1997).

Barkley, "Comparing Simple Role Based Access Control Models and Access Control Lists," 6 pp. (1997).

Barkley et al., "Role Based Access Control for the World Wide Web," 11 pp. (1997).

Ferraiolo and Kuhn, "Role–Based Access Control," Reprinted from Proceedings of $15^{th}$ National Computer Security Conference, 11 pp. (1992).

Barkley, "Implementing Role Based Access Control Using Object Technology," (1995).

Ferraiolo, "Role Based Access Control," NIST Web page, http://hissa.ncsl.nist.gov/rbac 2 pp., visited Jun. 1, 1999.

* cited by examiner

OBJECT SECURITY BOUNDARIES

TECHNICAL FIELD

The present invention relates to an application-programming model using software objects, and more particularly relates to maintaining security in object-based applications.

BACKGROUND OF THE INVENTION

In many information processing applications, a server application running on a host or server computer in a distributed network provides processing services or functions for client applications running on terminal or workstation computers of the network which are operated by a multitude of users. Common examples of such server applications include software for processing class registrations at a university, travel reservations, money transfers and other services at a bank, and sales at a business. In these examples, the processing services provided by the server application may update databases of class schedules, hotel reservations, account balances, order shipments, payments, or inventory for actions initiated by the individual users at their respective stations.

In a server application that is used by a large number of people, it is often useful to discriminate between what different users and groups of users are able to do with the server application. For example, in an on-line bookstore server application that provides processing services for entering book orders, order cancellations, and book returns, it may serve a useful business purpose to allow any user (e.g., sales clerk or customers) to access book order entry processing services, but only some users to access order cancellation processing services (e.g., a bookstore manager) or book return processing services (e.g., returns department staff).

Network operating systems on which server applications are typically run provide sophisticated security features, such as for controlling which users can logon to use a computer system, or have permission to access particular resources of the computer system (e.g., files, system services, devices, etc.) In the Microsoft Windows NT operating system, for example, each user is assigned a user id, which has an associated password. A system administrator also can assign sets of users to user groups, and designate which users and user groups are permitted access to system objects that represent computer resources, such as files, folders, and devices. During a logon procedure, the user is required to enter the user id along with its associated password to gain access to the computer system. When the user launches a program, the Windows NT operating system associates the user id with the process in which the program is run (along with the process' threads). When a thread executing on the user's behalf then accesses a system resource, the Windows NT operating system performs an authorization check to verify that the user id associated with the thread has permission to access the resource. (See, Custer, *Inside Windows NT* 22, 55–57, 74–81 and 321–326 (Microsoft Press 1993).)

A thread is the basic entity to which the operating system allocates processing time on the computer's central processing unit. A thread can execute any part of an application's code, including a part currently being executed by another thread. All threads of a process share the virtual address space, global variables, and operating-system resources of the process. (See, e.g., Tucker Jr., Allen B. (editor), *The Computer Science and Engineering Handbook* 1662–1665 (CRC Press 1997).)

The Windows NT operating system supports an application execution environment called Microsoft Transaction Server, a product separate from Windows NT which allows developers to define access control to processing services of an application independently of deployment during development using roles. Roles are logical groups of users that can be assigned at development time, and independent of a specific operating system security configuration until deployment. Subsequently, at deployment time, an administrator can bind the roles to particular users or user groups, resulting in a mapping of roles to users.

At execution time, Microsoft Transaction Server monitors cross process calls at the object and interface level to determine if the caller is a member of a role permitted to make the call. If the caller is not permitted access, the call is blocked, preventing access to the object's functionality by unauthorized users.

However, a problem can arise if two objects with different security requirements execute in the same process. For example, a first object might allow access by anyone, and a second object in the same process might allow access only by a select group. Since Microsoft Transaction Server checks only inter-process (i.e., cross-process) calls, a call could enter a process through the first object legitimately granting access to the caller. While doing work for the caller, the first object might call the second object for which the caller does not have access rights. Nevertheless, since security checks are made only for inter-process calls, the call could effectively circumvent the security services, having obtained unauthorized access to the functionality of the second object.

One way to prevent callers from circumventing the security system is to place each object in a separate process, ensuring that a security check is made for all calls between objects. However, each additional process consumes additional system resources, and cross process calls require invocation of additional logic consuming even more system resources. Therefore, placing every object in a separate process is expensive in terms of computing resources.

Another way to prevent callers from circumventing the security system is to place logic in the object to verify role membership before allowing calls to certain other objects. A disadvantage to such an approach is that object developers are burdened with incorporating security logic into their objects, and changing the logic requires rewriting and recompiling the application objects.

SUMMARY OF THE INVENTION

The present invention includes a security framework for controlling access to objects providing processing services in a server application. The security framework provides for intra-process access checks on calls to objects, thereby avoiding the need to place objects in different processes to enforce security boundaries. Access checks are done transparently to the application objects, freeing the application developer from having to incorporate security logic into the application objects.

In one aspect of the invention, a developer can declaratively define security requirements such as authorized users for calls to objects and a minimum acceptable authentication level for an application. The security framework tracks and enforces the requirements transparently to the objects, again freeing the application developer from including security-enforcing logic in the object.

A further aspect of the invention supports method-level security, allowing developers to declaratively define authorized users and authentication levels for particular methods, interfaces, or objects. Again, the developer is freed from having to incorporate logic in the object (i.e., in a particular method) to check security.

In yet another aspect of the invention, an application developer can declaratively define the security scheme using a graphical user interface depicting application objects, interfaces, and methods. The security settings defining the security scheme reside in a central store outside the application objects.

Another aspect of the invention supports role-based security in combination with intra-process security boundaries. Role-based security allows user identities to be defined independently of specific users during development of the application.

In another aspect of the invention, a security boundary is placed between objects of different applications, facilitating integration of multiple applications.

Additional features and advantages of the invention will be made apparent from the following detailed description of illustrated embodiments, which proceeds with reference to the accompanying drawings.

DETAILED DESCRIPTION OF THE INVENTION

The present invention is directed toward a method and system for providing an object execution environment with a security framework providing automatic security services. In one embodiment illustrated herein, the invention is incorporated into an object services component entitled "COM+" of an operating system entitled "Microsoft Windows NT Server 5.0," both marketed by Microsoft Corporation of Redmond, Wash. Briefly described, this software is a scaleable, high-performance network and computer operating system supporting distributed client/server computing, and providing an object execution environment for object applications conforming to COM. The COM+ component incorporates object services from prior object systems, including Microsoft Component Object Model (COM), Microsoft Distributed Component Object Model (DCOM), and Microsoft Transaction Server (MTS).

Exemplary Operating Environment

Figure 1:
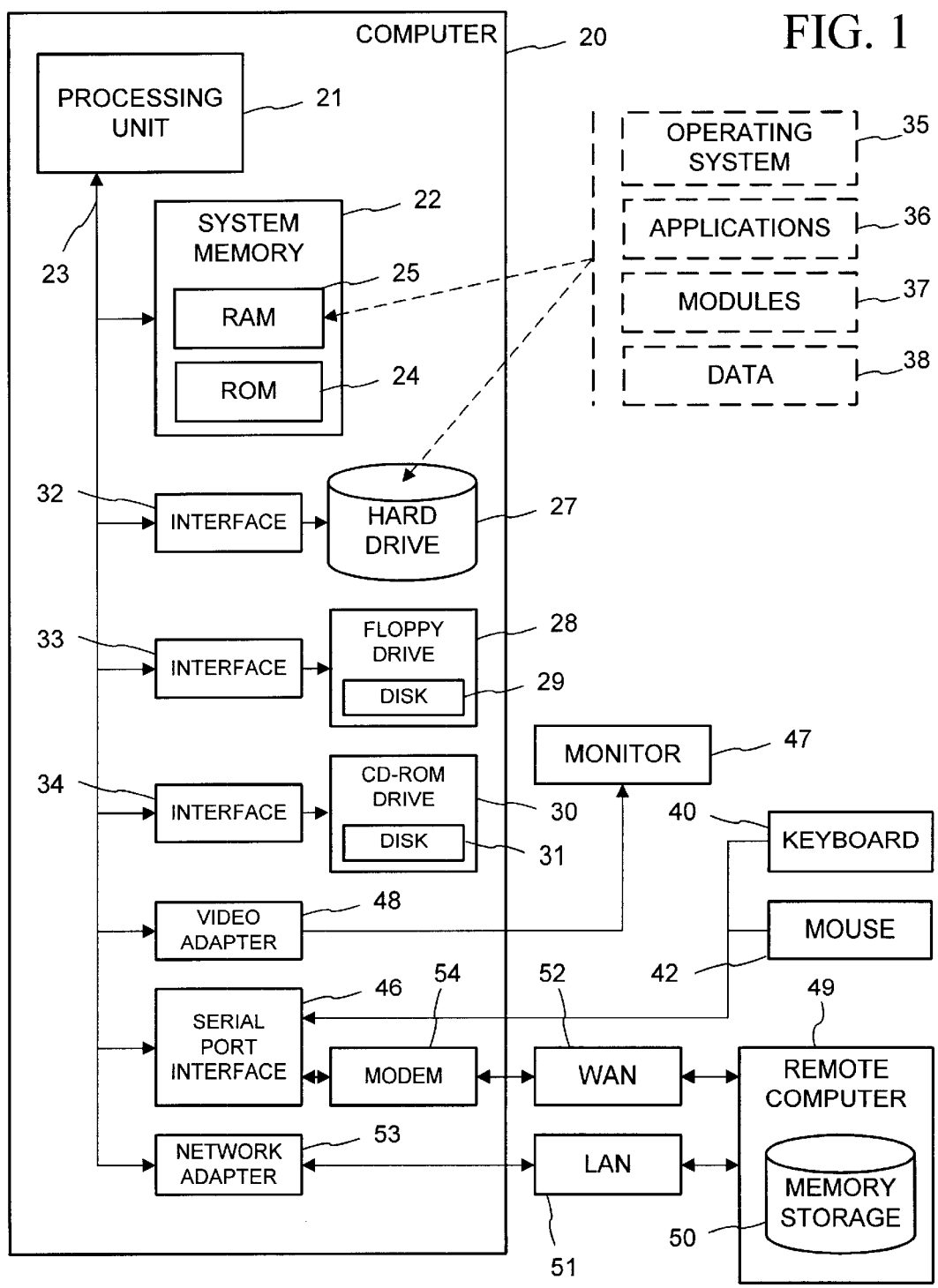
FIG. 1 is a block diagram of a computer system that may be used to implement a method and apparatus embodying the invention for implementing the described security framework for programming objects.

FIG. 1 and the following discussion are intended to provide a brief, general description of a suitable computing environment in which the invention may be implemented. While the invention will be described in the general context of computer-executable instructions of a computer program that runs on a computer, those skilled in the art will recognize that the invention also may be implemented in combination with other program modules. Generally, program modules include routines, programs, objects (also called components), data structures, etc. that perform particular tasks or implement particular abstract data types. Moreover, those skilled in the art will appreciate that the invention may be practiced with other computer system configurations, including single- or multiprocessor computer systems, minicomputers, mainframe computers, as well as personal computers, hand-held computing devices, microprocessor-based or programmable consumer electronics, and the like. The illustrated embodiment of the invention also is practiced in distributed computing environments where tasks are performed by remote processing devices that are linked through a communications network. But, some embodiments of the invention can be practiced on stand-alone computers. In a distributed computing environment, program modules may be located in both local and remote memory storage devices.

With reference to FIG. 1, an exemplary system for implementing the invention includes a conventional computer 20, including a processing unit 21, a system memory 22, and a system bus 23 that couples various system components including the system memory to the processing unit 21. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 21.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 24 and random access memory (RAM) 25. A basic input/output system (BIOS), containing the basic routines that help to transfer information between elements within the computer 20, such as during start-up, is stored in ROM 24.

The computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of data, data structures, computer-executable instructions, etc. for the computer 20. Although the description of computer-readable media above refers to a hard disk, a removable magnetic disk and a CD, it should be appreciate d by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38. The operating system 35 in the illustrated computer is the Microsoft Windows NT Server operating system, together with the before mentioned Microsoft Transaction Server.

A user may enter commands and information into the computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as a remote client computer 49. The remote computer 49 may be a workstation, a server computer, a router, a peer device or other common network node, and typically includes many or all of the elements described relative to the computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54, or is connected to a communications server on the LAN, or has other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

In accordance with the practices of persons skilled in the art of computer programming, the present invention is described below with reference to acts and symbolic representations of operations that are performed by the computer 20, unless indicated otherwise. Such acts and operations are sometimes referred to as being computer-executed. It will be appreciated that the acts and symbolically represented operations include the manipulation by the processing unit 21 of electrical signals representing data bits which causes a resulting transformation or reduction of the electrical signal representation, and the maintenance of data bits at memory locations in the memory system (including the system memory 22, hard drive 27, floppy disks 29, and CD-ROM 31) to thereby reconfigure or otherwise alter the computer system's operation, as well as other processing of signals. The memory locations where data bits are maintained are physical locations that have particular electrical, magnetic, or optical properties corresponding to the data bits.

Overview of Objects

Figure 2:
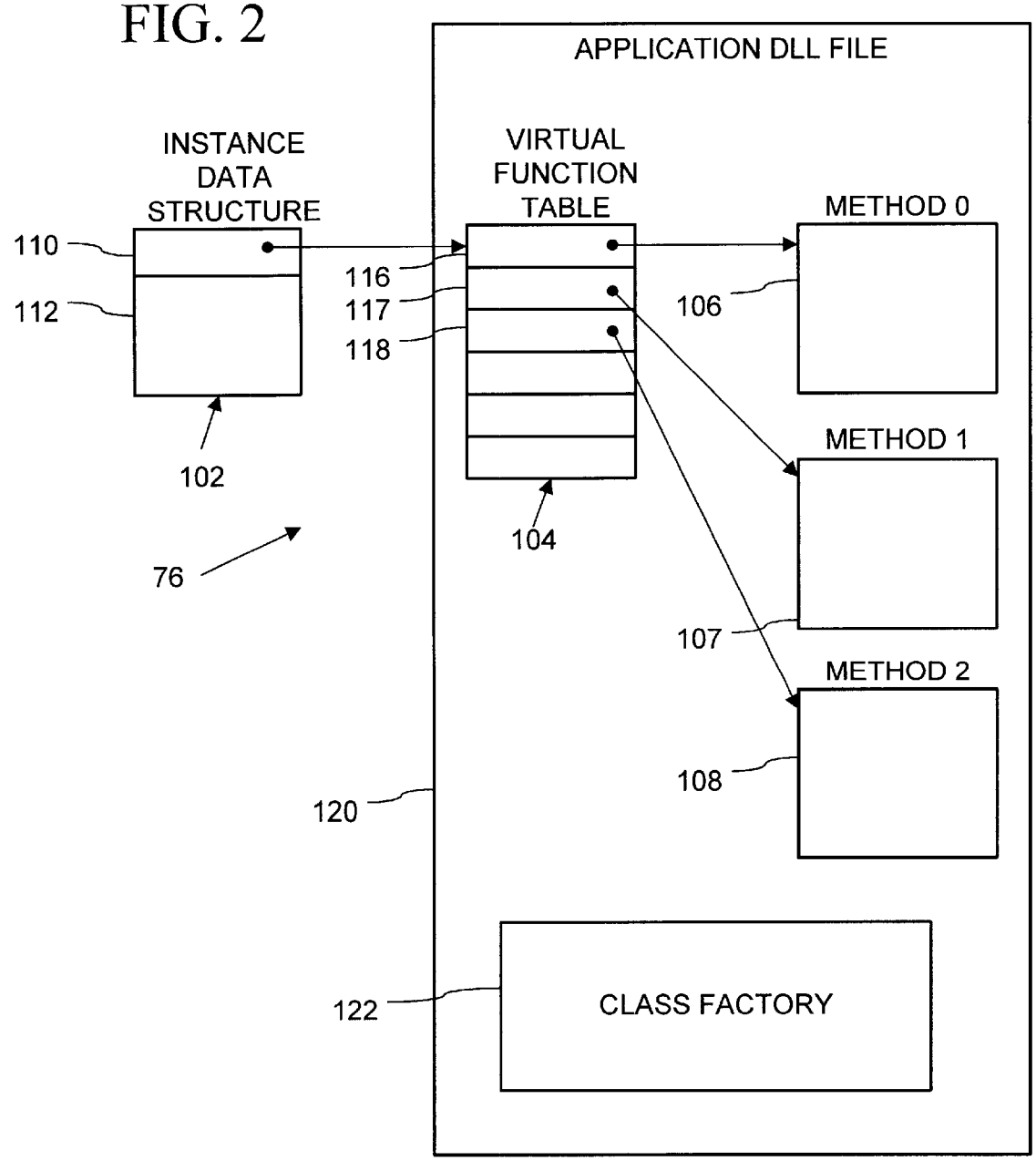
FIG. 2 is a block diagram of an object conforming to the Component Object Model specification of Microsoft Corporation.

FIG. 2 and the following discussion are intended to provide an overview of programming objects, using the Microsoft Component Object Model (COM) as an exemplary object model. In the illustrated embodiments, the security framework is implemented in an extension to the Microsoft COM Environment termed "COM+." COM is a model for accommodating programming objects and can be implemented on a variety of platforms, such as the Microsoft Windows NT operating system. In the illustrated embodiments of the invention, the application objects conform to the Microsoft Component Object Model ("COM") specification (i.e., are implemented as a "COM Object" 72) and are executed using the COM+ services of the Microsoft Windows NT Server 5.0 operating system, but alternatively may be implemented according to other object standards (including the CORBA (Common Object Request Broker Architecture) specification of the Object Management Group) and executed under object services of another operating system. The COM specification defines binary standards for objects and their interfaces which facilitate the integration of software objects into applications. (For a detailed discussion of COM and OLE, see Kraig Brockschmidt, *Inside OLE, Second Edition*, Microsoft Press, Redmond, Wash. (1995)).

Application developers build an application by designing a set of application objects (also called "application components") to implement the business logic of the application using a set of application objects, each of which contains program code for a portion of the application's work. For example, a banking application may comprise a transfer object, a debit account object, and a credit account object which perform parts of the work of a money transfer operation in the application.

With reference now to FIG. 2, in accordance with COM, the application object 76 is represented in the computer system 20 (FIG. 1) by an instance data structure 102, a virtual function table 104, and member functions 106–108. The instance data structure 102 contains a pointer 110 to the virtual function table 104 and data 112 (also referred to as data members, or properties of the object). A pointer is a data value that holds the address of an item in memory. The virtual function table 104 contains entries 116–118 for the member functions 106–108. Each of the entries 116–118 contains a reference to the code 106–108 that implements the corresponding member function.

The pointer 110, the virtual function table 104, and the member functions 106–108 implement an interface of the application object 76. By convention, the interfaces of a COM object are illustrated graphically as a plug-in jack as shown for the application object 206 in FIG. 3. Also, interfaces conventionally are given names beginning with a capital "I." In accordance with COM, the application object 76 can include multiple interfaces which are implemented with one or more virtual function tables. The member function of an interface is denoted as "IInterfaceName::FunctionName."

The virtual function table 104 and member functions 106–108 of the application object 76 are provided by an application program 120 (hereafter "server application DLL") which is stored in the computer on which the object is installed as a dynamic link library file (denoted with a ".dll" file name extension). In accordance with COM, the application DLL 120 includes code for the virtual function table 104 and member functions 106–108 of the classes that it supports, and also includes a class factory 122 that generates the instance data structure 102 for an object of the class.

Overview of Security Services

In the illustrated embodiments, a security framework provides various security services to objects, relieving application developers from having to incorporate security logic in application objects. The following is a broad overview of the framework's features; the framework is described in more detail in later sections.

Figure 3:
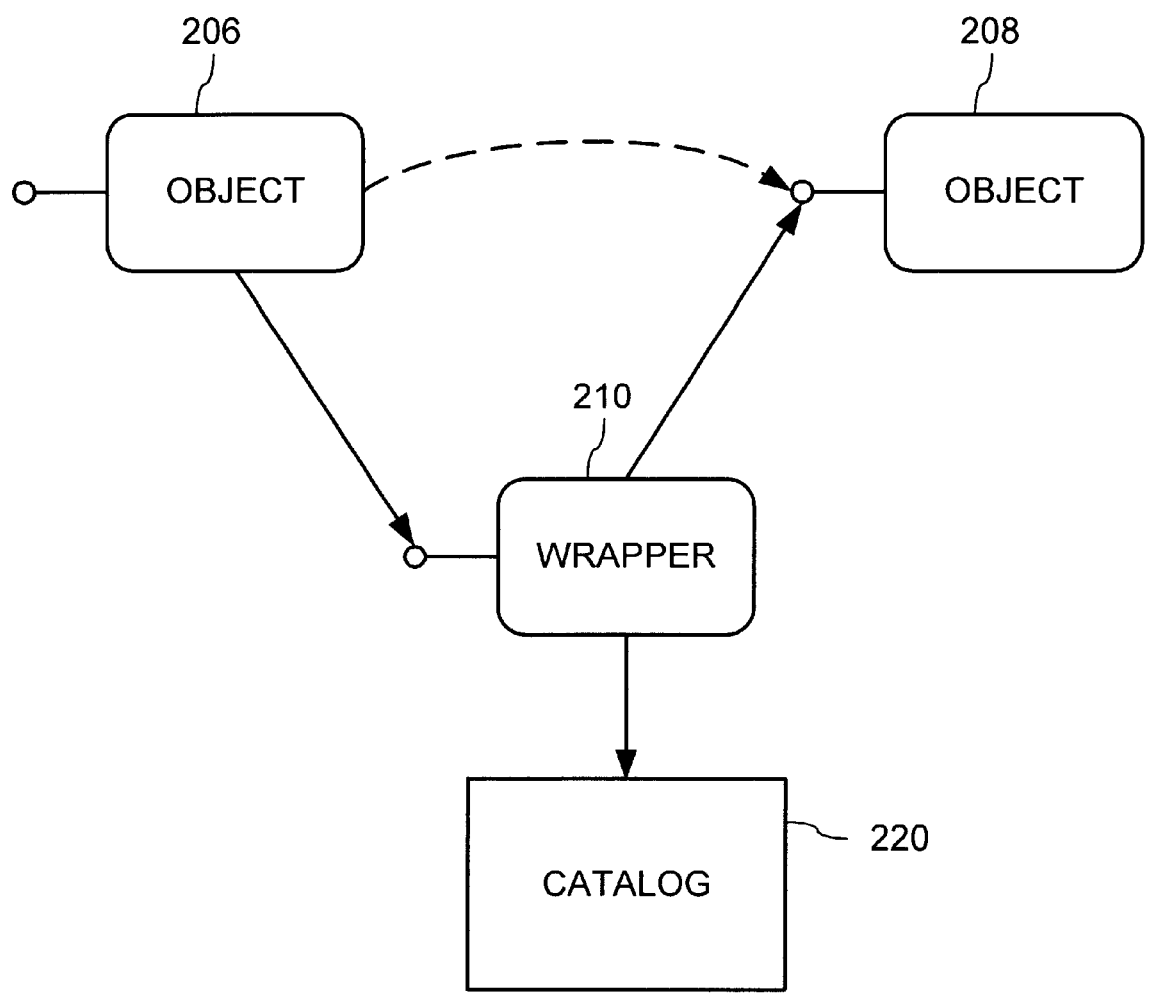
FIG. 3 is a block diagram of a wrapper arrangement for providing security services transparently to a calling and called object.

FIG. 3 shows two objects, 206 and 208. In the illustrated arrangement, the objects are sometimes referred to as a client object 206 and a server object 208, since the object 206 accesses functionality of the object 208. In some cases, the client object 206 might be a calling program (termed a "base client") instead of an object as shown. To indicate who is using the objects, an identity is associated with calls from the client object 206 (e.g., the identity of a logged on user or an identity indicating a computer system) as described in more detail below.

When the client object 206 attempts to access the functionality of the server object 208 it acquires a pointer to an interface of the server object 208 and issues a method call through the interface. As shown in FIG. 3, one of the features of the invention is to interpose a wrapper 210 between the objects, through which calls to the server object 208 pass. The wrapper 210 can invoke various security function calls to the operating system (e.g., to determine: the identity of a user) and accesses a catalog 220 to enforce security settings therein before relaying the call to the server object 208, if appropriate. One advantage of the illustrated arrangement is the security settings can be changed by modifying the catalog 220 without modifying or recompiling the objects. Also, the security framework can be modified to incorporate new technologies or improvements without having to modify legacy objects. Finally, developers of the business logic of the objects can avoid becoming familiar with abstruse security logic, speeding and simplifying application development.

The wrapper 210 can be interposed between the objects in a variety of ways (e.g., by an object creation service when the server object 208 is instantiated, or by unmarshaling code when a reference to 208 is unmarshaled) as described in more detail below. Also, the catalog 220 can be created in a variety of ways, such as by a graphical user interface or with reference to declarations in source code. The result of the arrangement shown in FIG. 3 is objects execute without regard to the design of the security framework; in other words, the security framework is transparent to the objects.

Figure 4:
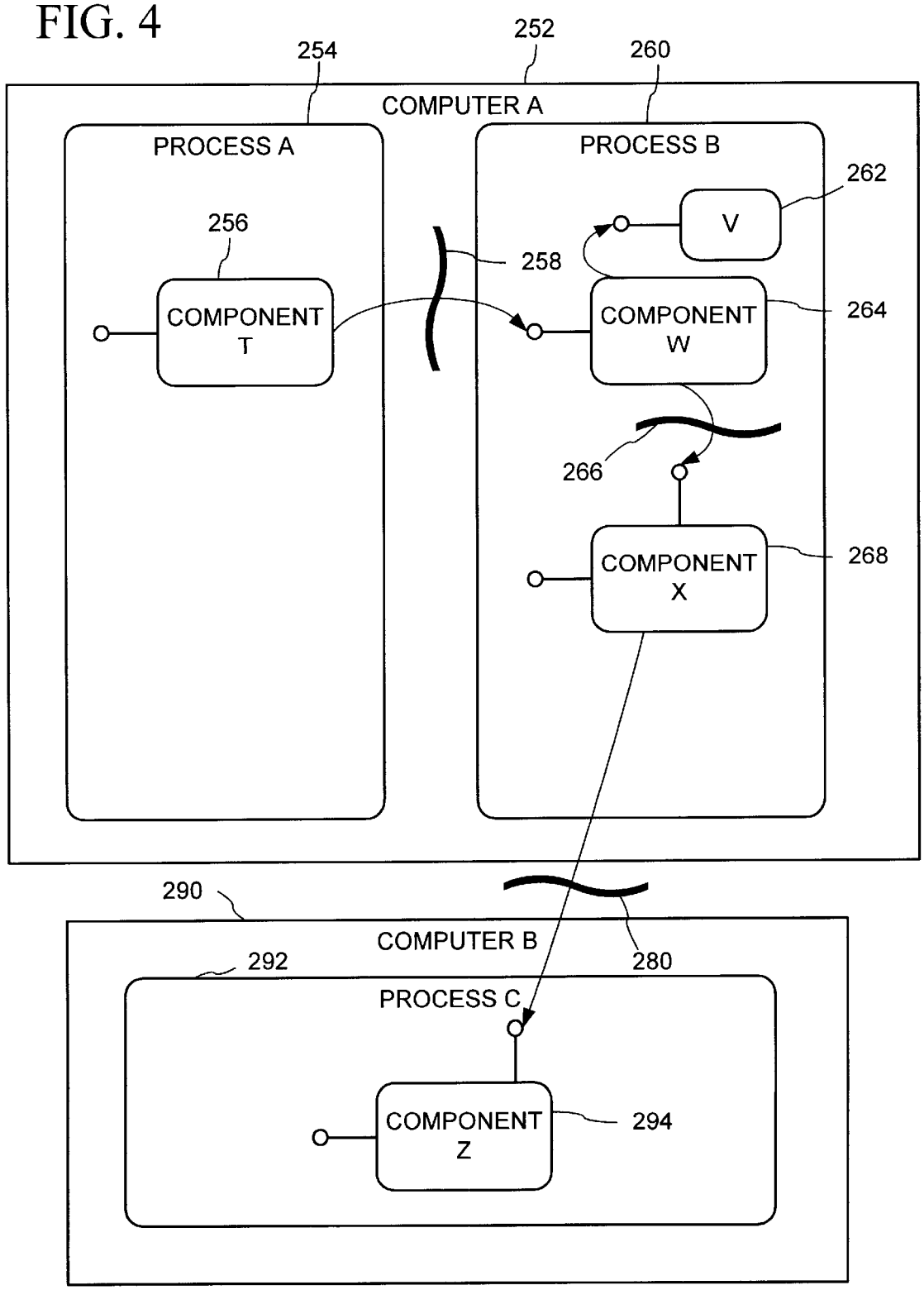
FIG. 4 is a block diagram of an intra-process security boundary implemented using the wrapper arrangement of FIG. 3.

Another feature of the framework, intra-process security boundaries, is shown in FIG. 4. The framework, using the wrapper arrangement described above, supports an inter-process security boundary 258 between an object 256 executing in a first process 254 and an object 264 executing in a second process 260; both processes reside on a computer 252. Although a call from the object 264 to another object 262 may take place without a security check, the framework provides for an intra-process security boundary 266 between the object 264 and another object 268. FIG. 4 also shows an object 294 executing in a process 292 on a different computer 290. The framework also supports a security boundary 280 between objects 268 and 294 executing on different computers. The ability to enforce a security boundary between two objects in the same process avoids having to create an additional process to enforce a security boundary. Since creation of additional processes consumes additional computing resources, the illustrated arrangement conserves resources compared to a framework not supporting intra-process security boundaries. The illustrated security boundaries 258, 266, and 280 can perform any variety of functions, such as identity checks and authentication level checks.

Figure 5:
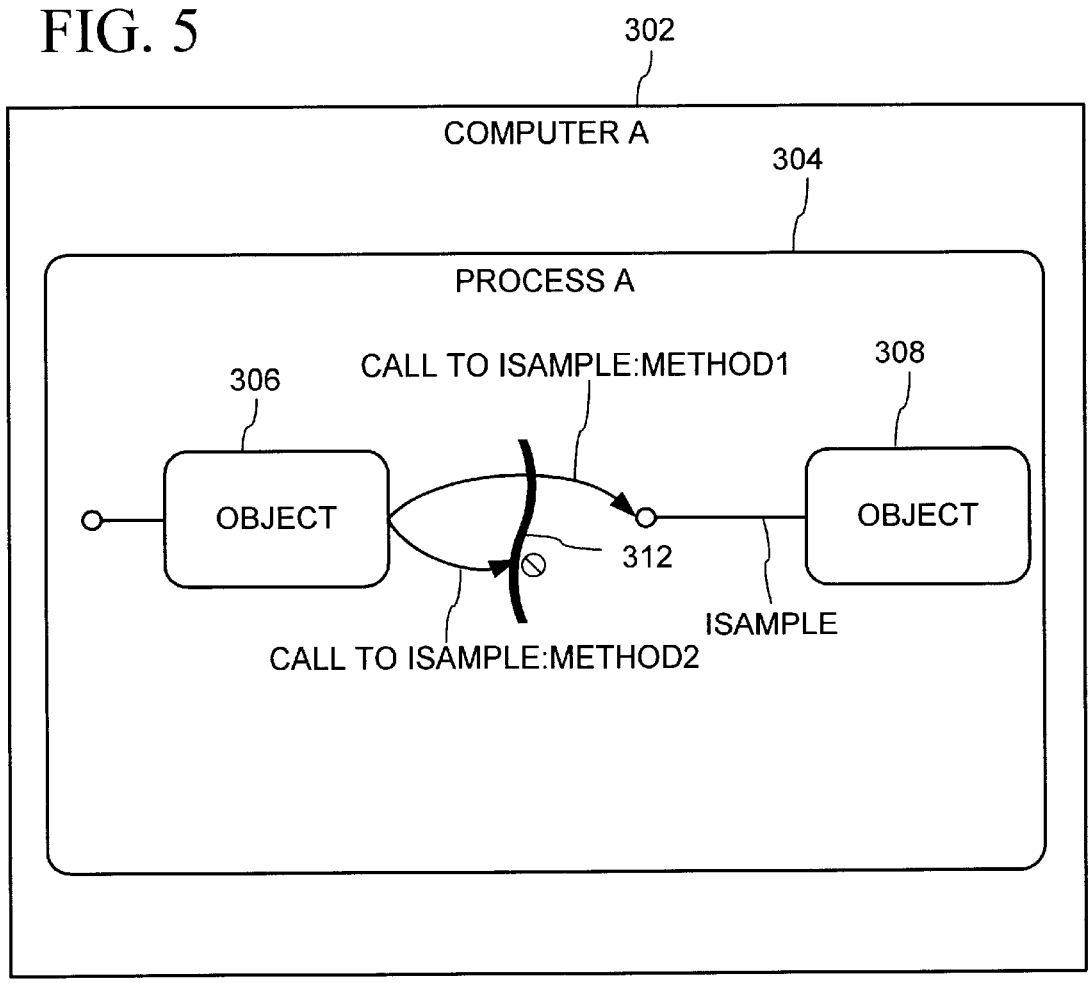
FIG. 5 is a block diagram of a per-method security scheme implemented using the wrapper arrangement of FIG. 3.

The security framework also supports method-level access checks as shown in FIG. 5. In the illustration, an object 306 is associated with a user identity and accesses the functionality of another object 308 through an interface ISample with two methods, method1 and method2. A security boundary 312 (e.g., one provided by the wrapper arrangement of FIG. 3) between the objects selectively prevents calls to the methods based on security settings (e.g., user identities or groups stored in a catalog) that differ from method to method. For example, one method may allow access by all user identities and another may restrict access to a select group of user identities. Method level security can be enforced in an intra-process call; in FIG. 5, both objects execute in the same process 304 on a computer 302. However, method level security can also be enforced between processes or between computers.

Figure 6:
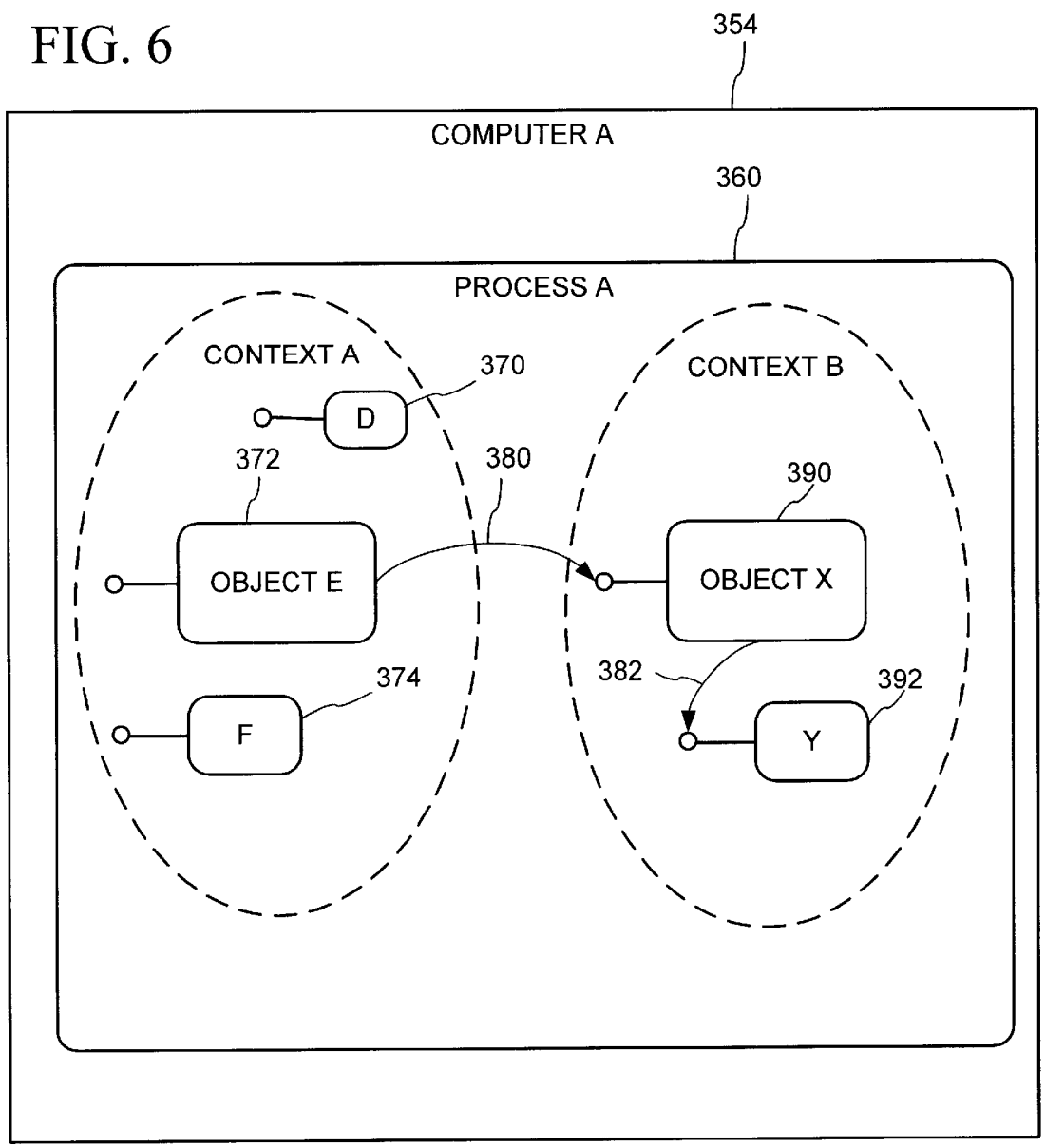
FIG. 6 is a block diagram of a security scheme in which objects of different applications are placed in different object contexts.

An exemplary use of the framework to achieve security boundaries is shown in FIG. 6, wherein objects are shown as residing in object contexts. Object contexts are an environment extensibility mechanism described at length in Thatte et al., "Environment Extensibility and Automatic Services For Component Applications Using Contexts, Policies And Activators," U.S. patent application Ser. No. 09/135,397, filed Aug. 17, 1998, the disclosure of which is incorporated herein by reference.

In summary, an object context is defined by its object context properties (e.g., a machine property, a process property, and an application property). If an object is in an object context having different object context properties from another object, the objects are said to be in different object contexts. A wrapper is automatically placed between references to objects residing in different object contexts by the object instantiation service of the operating system; the wrapper is provided with references to various policies as described below. The policies perform logic to establish an environment appropriate for the object context in light of the cross-context call. In the example, objects are associated with a unique application identifier indicating to which application an object belongs. The application identifier is incorporated into the object's object context as one of the object context properties. Accordingly, objects in different applications are placed into different object contexts and a wrapper is interposed between them. Associated policies perform logic (e.g., security checking) appropriate for a cross-application call.

With reference now to FIG. 6, various objects execute in a process 360 on a computer 354. The objects 370, 372, and 374 are members of one application and are accordingly placed in object context A; the objects 390 and 392 are members of another application and accordingly are placed in object context B. When an object in one application attempts to access the functionality of an object in the other application, a wrapper is automatically interposed between the objects (e.g., the call 380 is directed to a wrapper; the call 382 is not). The wrapper is provided with a reference to a security policy, which performs the various functions described above, such as enforcing an intra-process security boundary and enforcing method level security.

Although the example in FIG. 6 incorporates an object's application identifier as one of the object context properties to place:objects in an appropriate object context, the framework supports other arrangements. For example, a developer or vendor identifier could be used. Information indicating the objects' object context properties is acquired from a central database of object properties (e.g., a registry or catalog) and can also be collected at runtime (e.g., the machine on which an object is running can be included as an object context property).

Exemplary Implementation of the Security Framework

An example of an implementation of the security framework in the Windows NT operating system follows. The framework accesses various security services of the Windows NT operating system to implement a security scheme. For a more detailed description of the Windows NT security services, see Richard Grimes, "Professional DCOM Programming," pages 319–389 (Chapter 7, Security) 1997.

In summary, users and groups in Windows NT are identified by unique identifiers called security IDs (SIDs). A collection of SIDs for the identity of a user, the groups to which the user belongs, and other related information, such as an impersonation level, is assembled into a single structure called a token.

A token is kept as part of a process's information to indicate the user initiating the process. By default, calls originating from the process are identified by the operating system as associated with the process's token. Alternatively, an identity can be kept as part of a thread's information (e.g., to facilitate impersonation of a remote user). For example, the thread on which the client object 206 (FIG. 3) is executing may be associated with a token. If so, calls on the thread are identified by the operating system as associated with the thread's token.

A network connection between two machines (e.g., over a LAN or the Internet) can provide a certain degree of confidence about identities reported over the connection. Whenever a caller's identity is provided over a network connection, the degree of certainty about the caller's identity is represented as a particular authentication level. An authentication service includes authentication level information for identities reported over a network connection. When the authentication service creates a token, the authentication level is not placed into the token, but the authentication level is available from Windows NT's security services.

Authentication levels supported by Windows NT include none, connect level authentication, call level authentication, packet level authentication, packet integrity level authentication and encrypted packet authentication. A low authentication level (e.g., none), indicates no steps have been taken to authenticate the user's identity. At the authentication level "none," the user's identity is not available to the server. A higher authentication level (e.g., per-packet), indicates that some steps (i.e., each packet has been authenticated) have been taken to authenticate the user's identity. For example, the connect level indicates the user's identity was authenticated when the connection is first made (e.g., using a challenge/response scheme). The following table illustrates various authentication levels defined for Windows NT:

TABLE 1

| Name | Description |
| --- | --- |
| RPC_C_AUTHN_LEVEL_NONE | No authentication. |
| RPC_C_AUTHN_LEVEL_CONNECT | Authentication occurs when a connection is made to the server. Connectionless protocols do not use this, see _PKT, below. |
| RPC_C_AUTHN_LEVEL_CALL | The authentication occurs when a RPC call is accepted by the server. Connectionless protocols do not use this, see _PKT below. |
| RPC_C_AUTHN_LEVEL_PKT | Authenticates the data on a per-packet basis, all data is authenticated. |
| RPC_C_AUTHN_LEVEL_PKT_INTEGRITY | This authenticates that the data has come from the client, and it checks that the data has not been modified. |
| RPC_C_AUTHN_LEVEL_PKT_PRIVACY | In addition to the checks made by the other authentication techniques, this encrypts the packet. |

In the security framework, the identity of a user as reported by the system is associated with the authentication level used to authenticate the identity. In this way, both the reported identity and confidence in the reported identity can be evaluated when performing security checks.

Application developers and deployers can use the illustrated security framework to enforce various security requirements in a COM+ environment. For example, a developer can specify that particular users or groups of users are permitted to access a particular object's method and further require calls to an application be associated with at least a specified authentication level.

An interface presented to developers and deployers of applications using the security framework is illustrated as an enhanced version of the Object Explorer provided in the Microsoft Transaction Server, marketed by Microsoft Corporation of Redmond, Washington; the illustrated enhanced version is called the COM+ Object Explorer. The COM+ Object Explorer allows manipulation of various application object attributes. To facilitate application development and deployment, Microsoft Transaction Server supports logical classes of users called "roles" (e.g., a manager role and a teller role). When the application is deployed on a host computer, the roles are bound to actual users or groups of users at the host computer (e.g., the manager role binds to the group called "group4" and a user called "user2" at deployment time).

Figure 7:
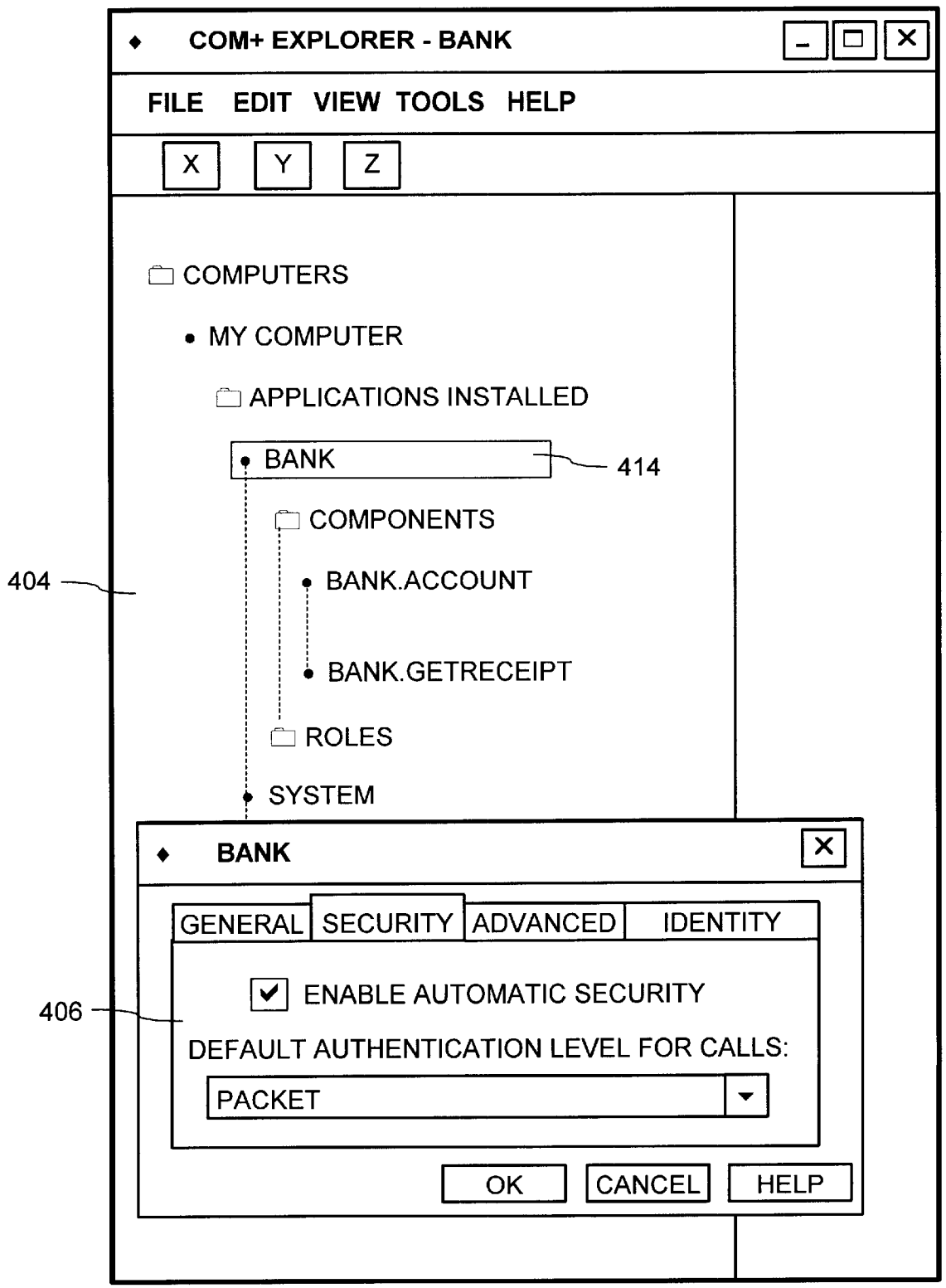
FIG. 7 is a view of a graphical user interface of an administration utility called the COM+ Object Explorer, for declaring various security requirements for objects.

The COM+ Object Explorer allows manipulation of objects conforming to the COM+ standard and can also accommodate objects developed under the COM standard. Among the operations supported by the COM+ Object Explorer are declaring security for particular objects, interfaces, and methods. A screen shot of the COM+ Object Explorer is shown in FIG. 7. A user (e.g., an application developer) is presented with a window 400 with a pane 404 showing a highlighted label 414 for the application "bank." The window 406 allows the user to enable automatic security by checking the appropriate checkbox. The user can also specify a default authentication level for calls to objects in the application.

The various settings selected during operation of the COM+ Object Explorer are kept in a central store called the catalog. Subsequently, when a developer wishes to prepare a particular application for distribution, the developer selects an export option, which allows the developer to export either a client version (to be run remotely from a server) or a server version (to accommodate remote client versions) of the application. These versions are also sometimes called "packages." The export option generates a catalog appropriate for the package; at deployment time, the catalog is imported into the computer onto which the package is deployed.

For example, selecting the automatic security checkbox as shown in FIG. 7 results in a catalog entry indicating automatic security for the component. Subsequently, when an instance of the component is instantiated, the operating system consults the catalog and places a security activator in the activation chain based on the automatic security setting as described in more detail below.

Figure 8:
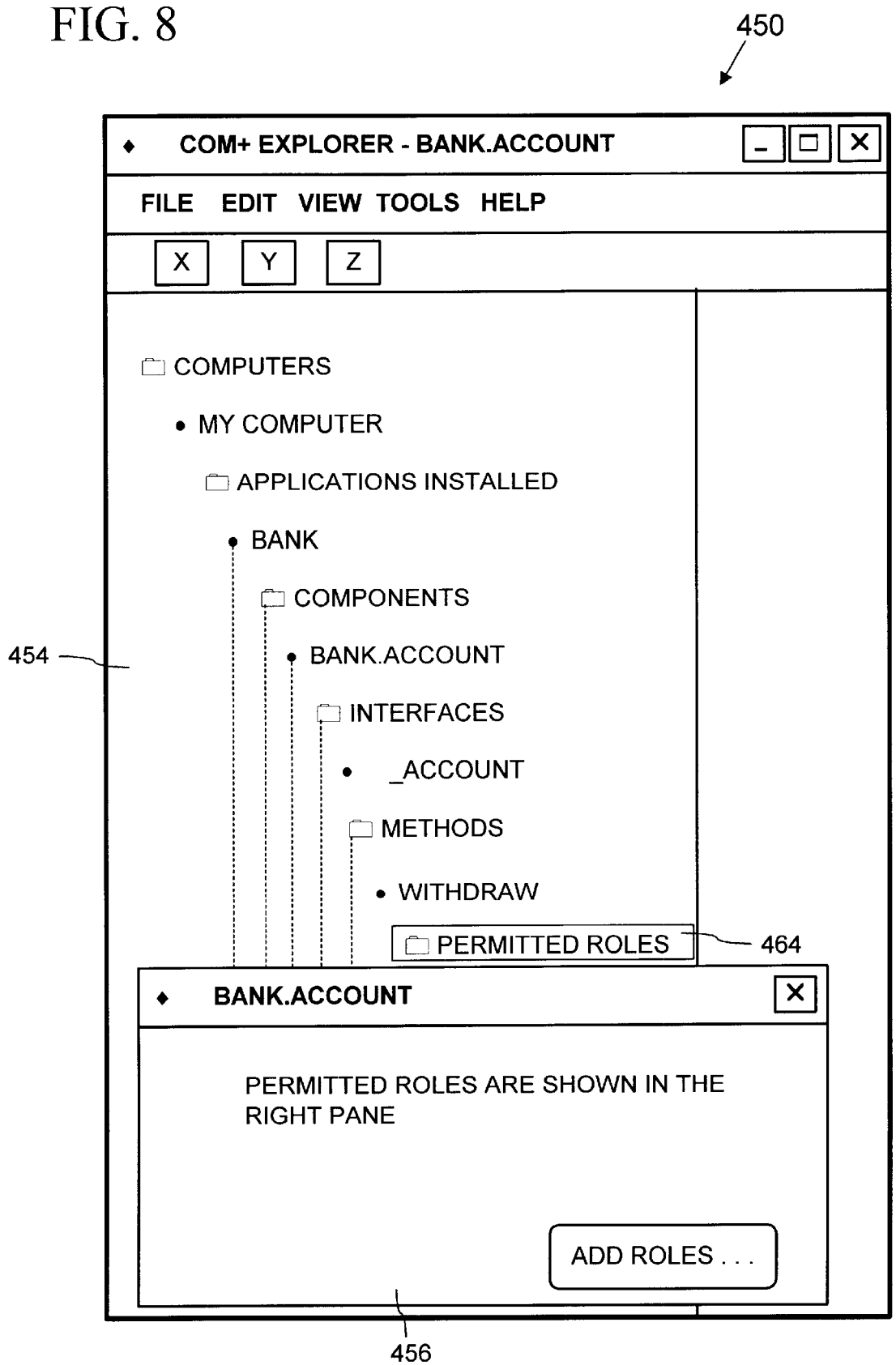
FIG. 8 is a view of a feature of the COM+ Object Explorer interface for enabling authorization checking for a particular object in an application.

With reference now to FIG. 8, a window 450 shows roles having access to a particular method in the bank application for an object "account." The "permitted roles" label 464 is highlighted in the pane 454, and the roles permitted to call the "withdraw" method of the "account" object are shown in the pane 460 (currently no roles). To add roles, the user activates the "Add Roles . . . " button in the window 456, resulting in the view of FIG. 9.

Figure 9:
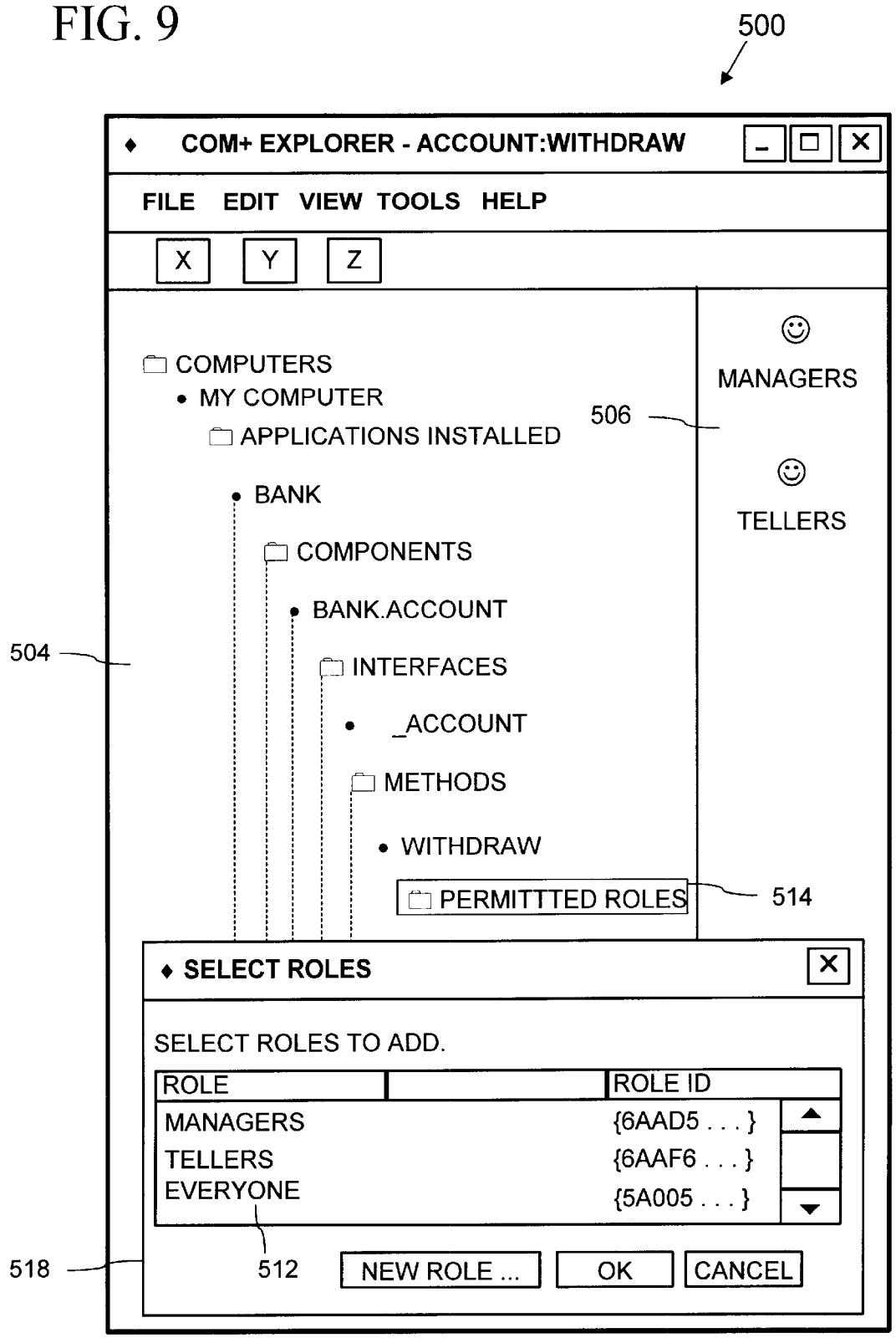
FIG. 9 is a view of a feature of the COM+ Object Explorer interface for limiting access to a particular method to specified particular roles.

In FIG. 9, the "permitted roles" label 514 for the method "withdraw" is highlighted, so the pane 506 in window 500 shows roles having access to the "withdraw" method of the "account" object. The window 518 shows the various roles 512 from which the user can select to add to the permitted roles. In FIG. 9, the "managers" and "tellers" roles are permitted to call the method.

In the illustrated embodiment, a single authentication level is associated for roles in an application; however, an alternative embodiment could allow a user to specify a different authentication level for each role. Although the example shows controlling access at the method level, a user can also control access at the application, object, and interface level by selecting an appropriate line in the interface. Roles specified at a higher (e.g., the application) level apply to lower (e.g., interface and method) levels unless explicitly specified otherwise.

An alternative way to declaratively define security in the framework is to put various declaration lines in the object's source code. The declarations are scanned at compile time to assemble access control settings instead of or in addition to using the COM+ Object Explorer. Subsequent changes can be made and rescanned without having to recompile the objects. An example of such declaration lines follows:

TABLE 2

[ RoleAccess = "managers,tellers" ]
Interface ISecureFunctions
{
    [ RoleAccess = "managers" ]
        double SetBalance
            ([in] long 1Account, [in] double dAmount);
//no RoleAccess attribute implies no method-level check
        double GetBalance
            ([in] long 1Account, [out] double *pdAmount);
}
[ RoleAccess = "manager, tellers, temps" ]
coclass Bank : public ISecureFunctions, IOpenFunctions
{
    public:
        //function declarations or business logic
}

Figure 10:
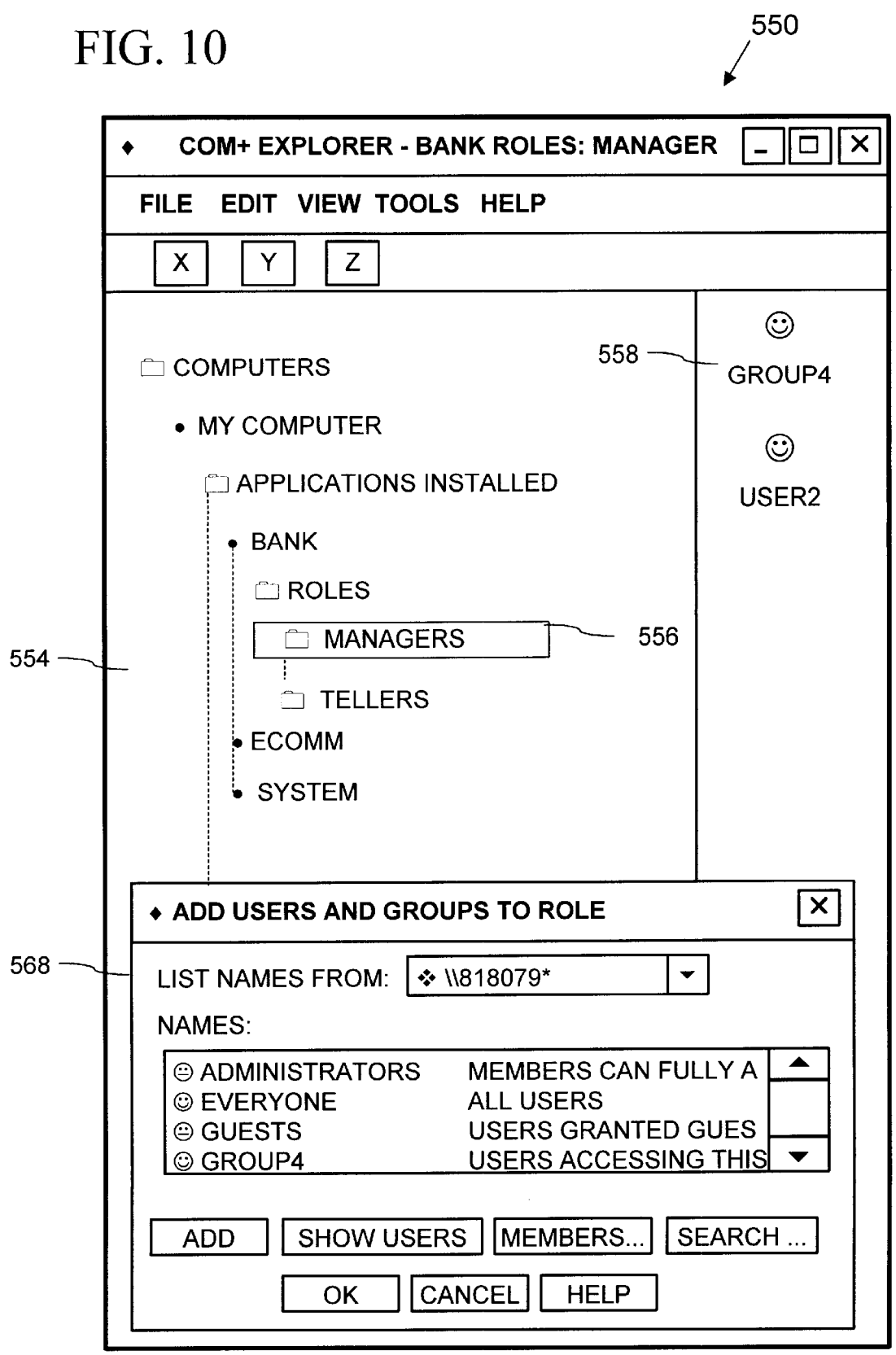
FIG. 10 is a view of a feature of the COM+ Object Explorer interface for adding users and groups to a role when an application is deployed on a host system.

When the application is deployed, the deploying user is presented with an interface as shown in FIG. 10. The window 550 includes a pane 554, which has a highlighted line for the managers role 556. The pane 558 shows the current users and groups to be bound to the role "managers" are group4 and user2. The deploying user can add various users and groups to the role by selecting from those shown in the window 568. When the deploying user has completed selecting various groups and users for the roles, the roles are bound to the selected groups and users by storing role information in the catalog, as shown in more detail below. The various role settings can be modified after deployment by another user, such as a system administrator with an appropriate password.

Figure 11A:
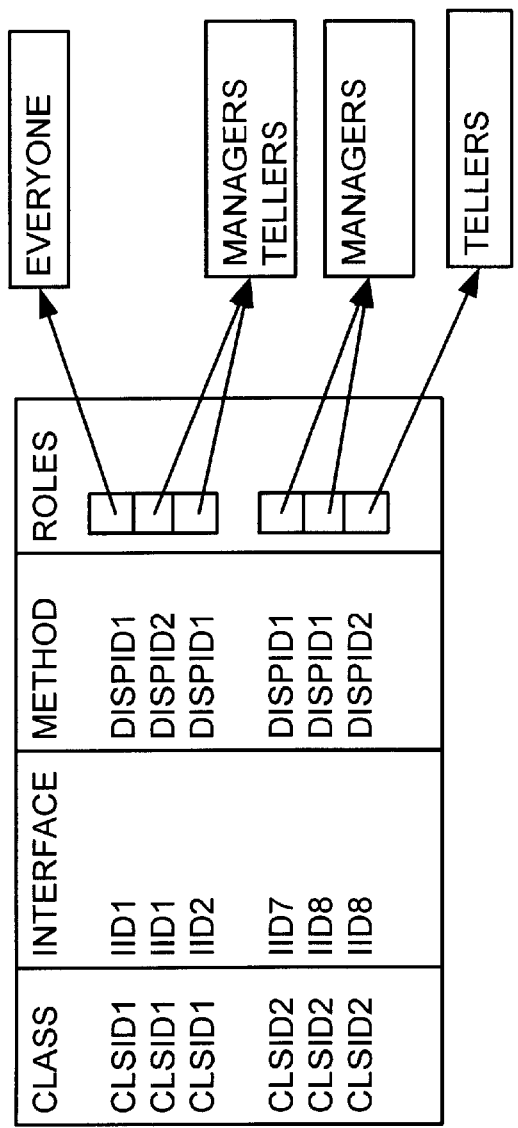
FIG. 11A is a block diagram showing a portion of a store called a catalog for defining access to methods.

FIG. 11A shows a security-related portion of a catalog generated for a deployed application. Although various arrangements are possible, the illustrated catalog organizes the permitted role settings by class, interface, and method. The entries in the catalog show the permitted roles for various methods. Objects are denoted by their class identifier (CLSID), a globally unique identifier (GUID) identifying the object's class. An interface identifier (IID) identifies the interface, and a dispatch identifier (DISPID) identifies the method. Methods are commonly assigned a particular DISPID according to the position (e.g., 2) the method has in the interface declaration. Roles is a list of those roles permitted to access the particular method. For sake of example, the second entry in the table might represent the second method "deposit" of the first interface "IAccount" to a particular class "Account" of objects. Calls to the method "deposit" are allowed by the roles "managers" and "tellers."

Figure 11B:
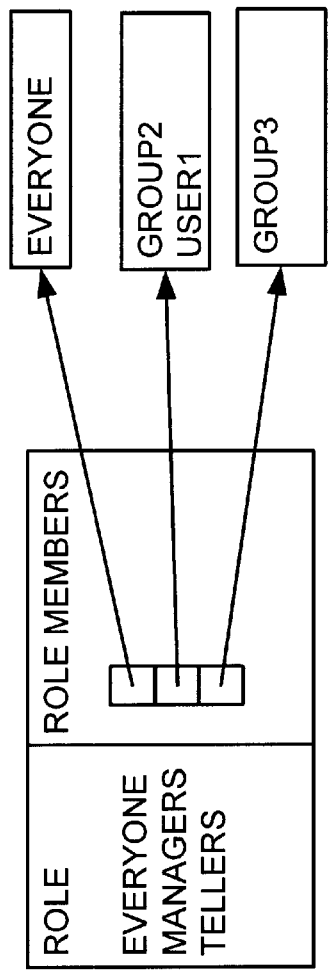
FIG. 11B is a block diagram showing a portion of the catalog defining role membership.

FIG. 11B shows another portion of the catalog indicating which users and groups are in what roles. The users and groups are represented by the security identifiers (SIDs) in the catalog. In the example shown, the "managers" role is filled by members of "group2" and the user "user1."

Figure 11C:
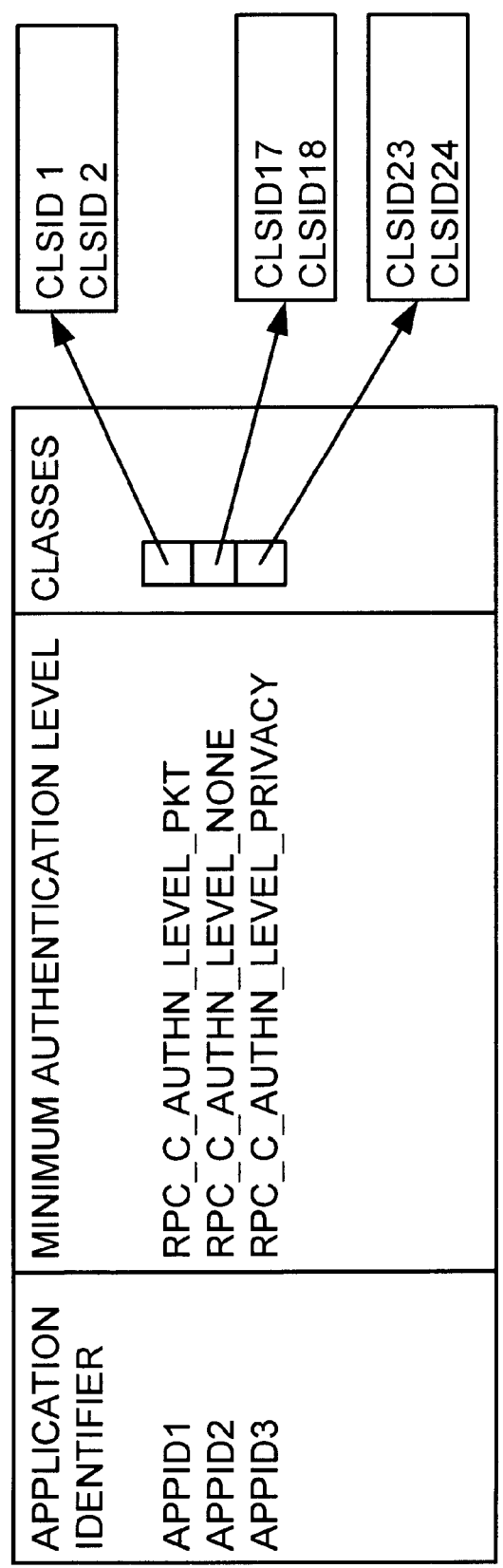
FIG. 11C is a block diagram showing a portion of the catalog related to applications.

FIG. 11C shows a third portion of the catalog listing the application identifier (APPID) of each application, the authentication level for calls to the application, and a list of class identifiers (CLSIDS) belonging to the application. In the example shown, Appld1 requires a minimum authentication level of RPC_C_AUTHN_LEVEL_PKT and consists of the objects represented by CLSID1 and CLSID2.

A hashing algorithm is used to quickly find an entry in the catalog for a particular method of an interface to a class of objects. The entries could alternatively be stored in a central configuration database in Windows NT called the registry.

Overview of Object Contexts, Activators, Policy Makers, and Policies

Figure 12:
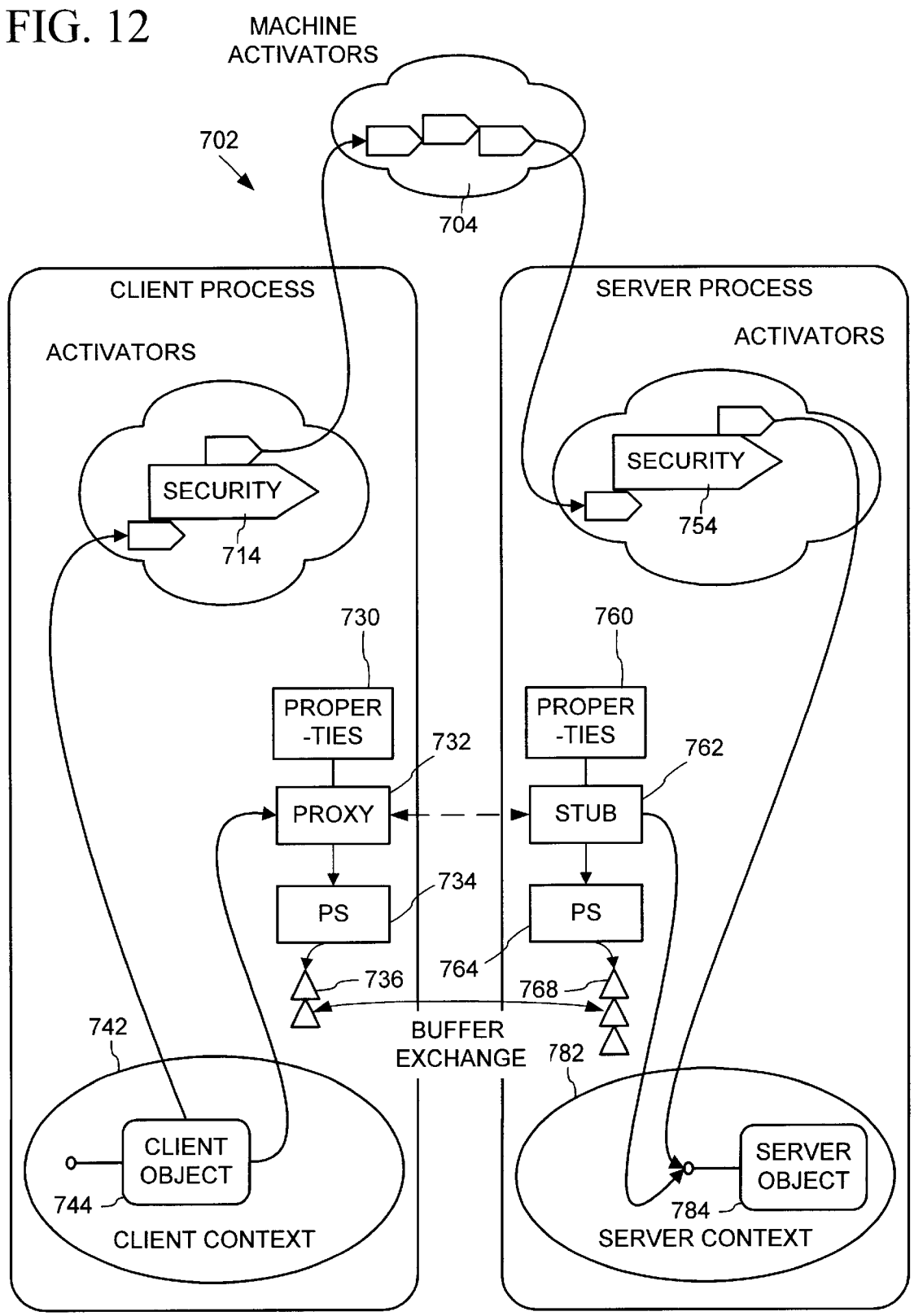
FIG. 12 is a block diagram illustrating object instantiation and method invocation in an environment supporting object contexts.

The following description details an implementation of the security framework in a COM+ environment supporting object contexts and related services. An example of object instantiation in an environment 702 supporting object contexts is shown in FIG. 12.

In the example, the two objects 744 and 784 are members of different applications. When the object 744 (also called a client object) wishes to access the functionality of the object 784 (also called a server object), it does so by requesting an interface to an instantiated instance of the object 784. The reference is acquired by supplying the class identifier of the server object 784 to an enhanced version of the "CoCreateInstance( )" object creation API, which employs a chain of activators associated with the server object 784. The activators may be specific to the requested object class, the location (e.g., machine activators 704), and other object context properties. In the illustrated example, automatic security has been set for the server object 784, and the catalog so indicates; so the security activator 754 is included in the activation chain when objects of the server object's class are instantiated. As shown, the arrangement could be extended by including an optional security activator 714 on the client side. However, security could be implemented solely on either side (e.g., only on the server side). An alternative implementation uses a standard activator to determine whether automatic security is set for the object and sets an appropriate object context property indicating automatic security.

In some cases, traversal of the activation chain results in the server object 784 being created in the same object context as the client object 744 that requested its creation (i.e., the client object context 742). In other cases, the traversal results in the object 784 being created in another object context (i.e., a separate server object context 782). If the resulting object context does not yet exist, the activation chain creates the server object context 782 (i.e., by assembling appropriate object context property objects 760). In still other cases, the activation chain can terminate activation of the object (e.g., if security so requires), or defer activation.

In the illustrated example, the activation chain begins with an initial delegation to an activator (termed the "immediate activator") by the "CoCreateInstance( )" or other object creation API. This initial delegation by the "CoCreateInstance( )" API is to a class-specific activator (i.e., specific to the server object's class) if any is designated for the class. The class-specific activator can implement specific processing for the class during instantiation, such as setting particular object context properties (e.g., automatic security) when objects of the class are instantiated. Otherwise, if no class-specific activator is designated for the class, the "CoCreateInstance( )" API delegates to a default activator of the client object context 742. The default client object context activator can implement activation processing specific to a particular type of object context. For example, object contexts that incorporate particular domain-specific behaviors (e.g., automatic security) can provide a default activator to set object context properties specific to the behaviors (such as to screen inter-application calls). Finally, if the client object context 742 does not provide a default activator, the "CoCreateInstance( )" API initially delegates to a default object context activator.

The activators in the activation chain determine in which object context an object will reside by assembling a set of object context properties (e.g., the process in which an object resides and the application to which an object belongs). The object context properties are embodied in object context property objects, which can have a variety of interfaces. In the illustrated example, one of the object context property objects embodies an application identifier indicating to which application an object belongs.

After assembling the object context properties 730 and 760 of the object, the object context property objects having a policy maker interface (i.e., IPolicyMaker) are consulted and may contribute policies to the policy set. The policy set may be assembled at instantiation time, or alternatively be deferred until the reference to the server object 784 is first used (e.g., at unmarshaling time). The various policy set references 734 are available to the proxy 732, and the policy set references 764 are available to stub 762 on the server side. As a result, the proxy/stub arrangement functions as a wrapper between the client object 744 and the server object 784. Subsequently, when a cross-context object reference is used to access the interface to the server object 784, logic contained in the policies contributed to the object's policy set is executed automatically and transparently.

In the illustrated example, an object context property object for representing the application to which the server object belongs has a policy maker interface and contributes a security policy 736 to the policy set because the server object 784 is of a different application than the client object 744. If a call is made to the server object 784, the security policy 736 is automatically executed transparently to the caller and the called object; thus, security requirements for an object can be enforced even though the object itself contains no security logic.

Similarly, on the server side of the arrangement, a stub 762 has access to a security policy 768, which is placed in the policy set references 764. The machine activators 704 can also provide other functions related to security, such as reporting the authentication level at which a remote identity is provided. After instantiation is complete, the client object 744 is provided a reference to the proxy 732 in place of a direct reference to the server object 784. The proxy 732 then marshals the parameters and relays a call to the server object 784 to the stub 762, which unmarshals the parameters and relays the call to the server object 784. The proxy and stub automatically invoke the policies in the policy set at various stages during the call to the server object 784. Each policy has an interface (i.e., IPolicy) to which four events are sent: call, enter, leave, and return. Upon receiving the event, the policy executes logic particular to the event, if any. A method call to the server object 784 results in the following sequence of events:

TABLE 3

1. Issue method call from client program (e.g. object 744) to proxy
2. Issue call event to policies to client-side policy set
3. Direct call to stub
4. Issue enter event to server-side policy set
5. Execute object method, return results to stub
6. Issue leave event to client-side policy set
7. Return method results to proxy
8. Issue return event to client-side policy set
9. Return method results to client program Calls to the policies can result in termination of the steps listed above, thus effectively terminating the call. For example, a security policy called in step 4 could indicate a calling client object does not have access privileges, causing step 5 to be skipped (steps 6–9 would still execute, but they would be notified the call failed due to lack of access privileges).

In addition, the various policies can communicate via a buffer transfer mechanism. The example of FIG. 12 shows a cross-process call; however, object contexts can be implemented in a single process, as described below and shown in FIG. 13.

Figure 13:
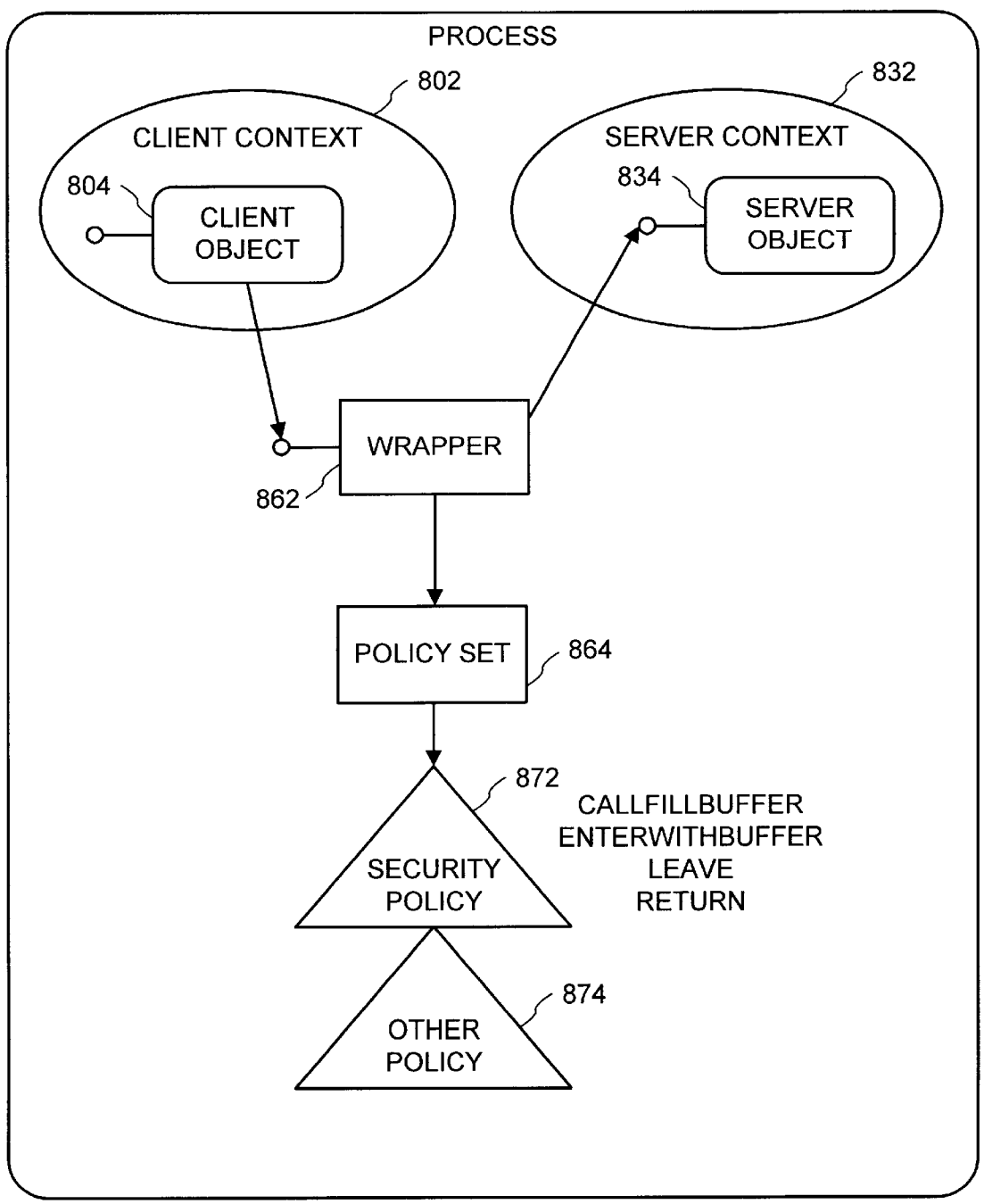
FIG. 13 is a block diagram illustrating a lightweight wrapper arrangement for supporting object contexts within a process.

FIG. 13 shows an exemplary arrangement employing a security policy in an intra-process call. Calls from the client object 804 to a server object 834 are first directed to a wrapper 862, which consults the policy set references 864, including a reference to a security policy 872 and another policy 874. A single security policy 872 can contain logic for call, enter, leave, and return events. The illustrated wrapper 862 is a lightweight replacement for a proxy-stub combination and does not marshal the parameters passed to the server object 834, except for interface pointers.

The wrapper 862 executes the security policy transparently to the objects 804 and 834. Another way of describing the arrangement of FIG. 13 is to assert the client object 804 is in an object context 802 and the server object 834 is in a different object context 832. Calls between the object contexts are automatically intercepted by the wrapper 862, providing a security boundary between the object contexts.

Exemplary Method Level Security Implementation with a Security Policy

Figure 14:
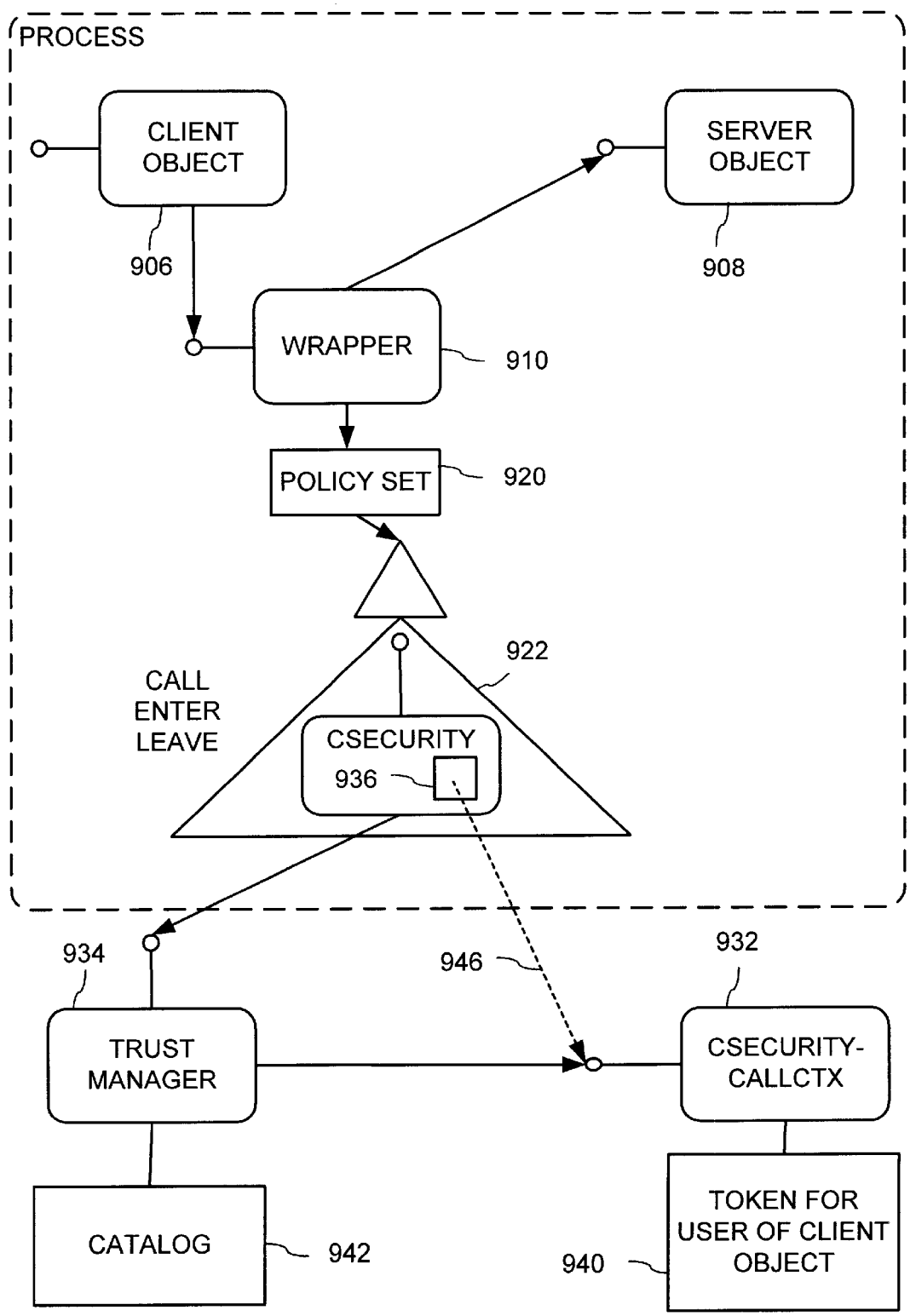
FIG. 14 is a block diagram illustrating an exemplary intra-process security framework using object contexts.

An exemplary arrangement for providing a security framework in accordance with the invention is shown in FIG. 14. In the example, a client object 906 of one application accesses the functionality of a server object 908 of another application through a lightweight wrapper 910 transparently interposed between the two objects during instantiation of the server object 908 as described above. The wrapper 910 accesses policy set references 920, including a reference to the security policy (CSecurity) 922 automatically included in the policy set because the two objects are of different applications (i.e., they have different object context properties and reside in different object contexts). The interface presented by the wrapper 910 appears to the client object 906 to be the interface presented by the server object 908. When the security policy 922 is created, it receives the class identifier of the server object 908.

When the client object 906 attempts to access a method of the server object 908, the wrapper 910 automatically sends a call event to the security policy 922. Upon receiving the call event, the security policy 922 uses the CoGetCallContext( ) COM+ API to acquire a reference 936 to a collection of information about the call termed the "call context." The call context is stored in the security call context object 932 and includes a reference to a token 940 associated with the call. As described above, the COM+ component of the operating system provides either the token associated with the calling object's process or the token associated with the calling object's thread, if any.

The security call context object 932 implements an interface ITrustable to provide the following information related to the call: the class identifier (CLSID) of called object, the interface identifier (IID) called, the method called, the dispatch identifier (DISPID) of the method called, and the security identifier (SID) of the caller. The token 940 indicates the caller's identity, and group membership, if any. Authentication information is also provided by the call context object 932 and is collected from the COM+ component of the operating system.

Subsequently, an enter event is issued to the security policy 922. Upon receiving the enter event, the policy 922 provides the pointer 936 to the trust manager 934, which determines whether to allow the call based on information in the catalog 942 and the security call context object 932. The catalog 942 is a central information store for the computer on which the objects 906 and 908 execute and contains information indicating security settings configured by the application developer at development time and possibly modified at deployment time, including information about roles, as described above.

Specifically, the trust manager 934 consults the security call context object 932 to determine whether the token 940 associated with the user of the client object 906 contains appropriate identity information to allow access as indicated in the catalog 942. If the call is rejected, a response indicative of rejection is returned to the security policy 922, which provides an appropriate response to the client object 906 (e.g., a response indicating the call failed because security requirements were not met). If the call is allowed, the response supplied to the security policy 922 results in the wrapper 910 forwarding the method call to the server object 908, obtaining any results, and relaying the results back to the client object 906.

For sake of example, assume the catalog indicates users in group2 authenticated by a minimum authentication level of packet (RPC_C_AUTHN_LEVEL_PKT) are permitted to call the method being invoked. If the token 940 indicates the user of the client object 906 is a member of group2, and the security call context object 932 indicates the client was authenticated by the level packet (RPC_C_AUTHN_LEVEL_PKT), the call would be forwarded to the indicated method of the server object 908. If, however, the token 940 indicates that the user is not a member of group2 or if the user was not authenticated, the call would be rejected. In this way, a method-level intra-process security boundary is enforced by logic outside the calling and called objects. The catalog 940 can be changed to change characteristics of the security boundary without modifying the objects 906 or 908. To improve performance, the trust manager 934 can be configured to maintain a cache of catalog entries.

An alternative implementation stores the reference 936 in a different way. Upon receiving the call event, the security policy 922 associates the security call context object 932 with the current logical thread in a mapping table. The mapping table maintained by the security policy 922 associates logical threads (also known as causality identifiers) with a stack of security call context objects. The mapping table facilitates use of the object by multiple logical; threads and allows caching of the security call context. Stacks are used to support the possibility of reentering a process on the same logical thread of execution. The call event results in a push to the stack for the logical thread. Upon receiving the enter event, the policy 922 supplies the trust manager 934 with the appropriate reference from the stack based on the current logical thread in the mapping table. A leave event results in a pop from the stack.

Another alternative implementation stores the call context information pointer on thread-local storage, which follows the thread. Another alternative to storing the call context is to simply call CoGetCallContext( ) to retrieve information about the current call context when needed (e.g., in the trust manager, in the security policy, or in the wrapper before the user is checked) instead of acquiring and relaying a pointer at different stages.

Some calls may cross machine or process boundaries. Such calls employ a server-side and client-side policy set, and the policy sets communicate via a buffer mechanism. In this way, information about the call context is marshaled from the proxy at the client object to the stub at the server object. In such a case, the call event is a callfillbuffer event which fills the buffer with the call context at the client side, and the enter event is an enterwithbuffer event which reads the buffer for the call context at the server side.

Exemplary Use of an Intra-Process Security Boundary

Figure 15:
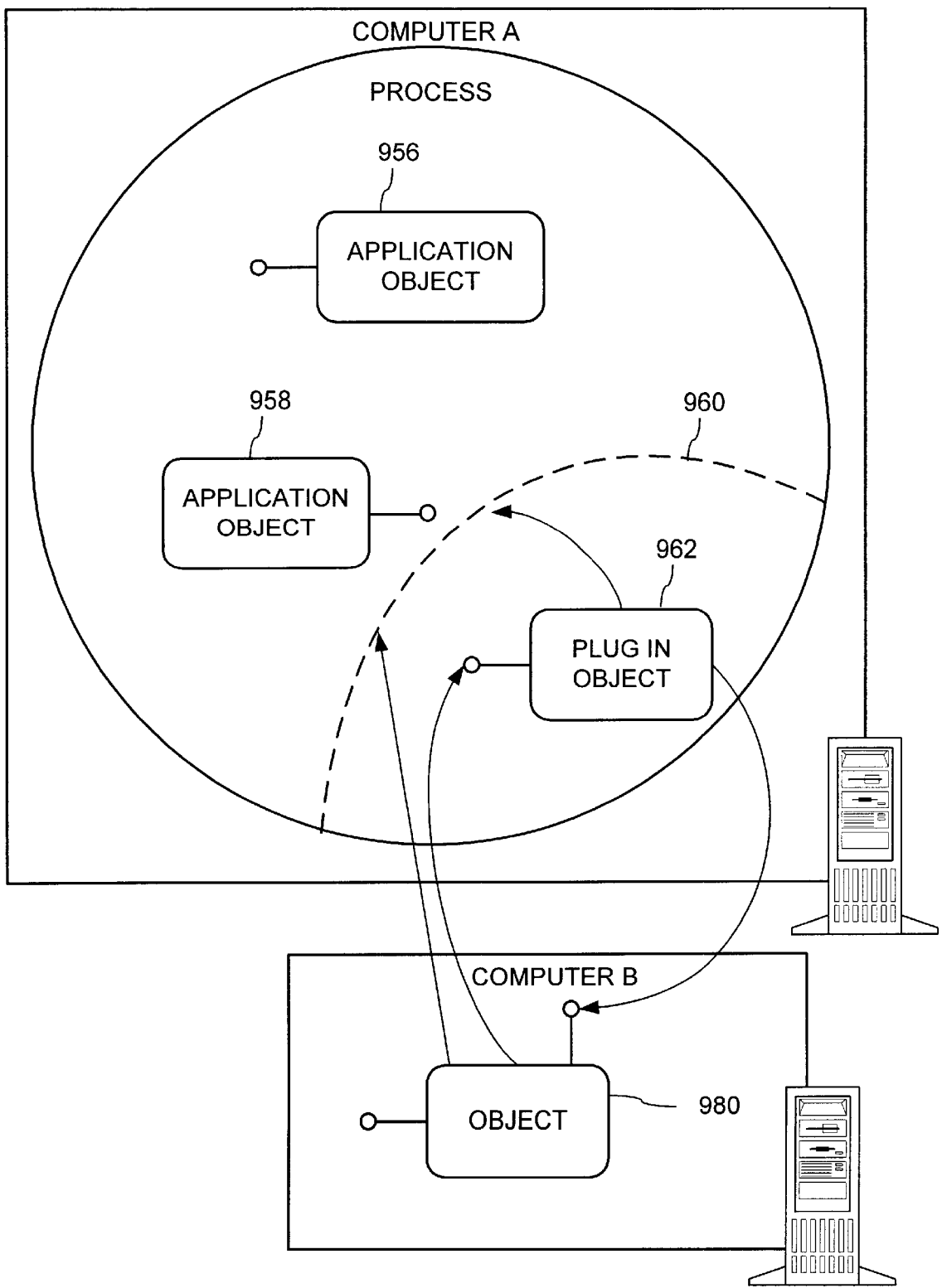
FIG. 15 is a block diagram illustrating an exemplary intra-process security boundary.

FIG. 15 illustrates an exemplary use of,the security framework to implement an intra-process security boundary. In the example, objects in different applications are placed in different object contexts, and a wrapper is automatically interposed between inter-application calls as well as between inter-computer calls. A security policy checks method calls between applications.

Two objects 956 and 958 are defined in the catalog as part of a first application (e.g., a network browser) from a first developer. The first developer has set security for the first application to require authentication of callers at some level above none (e.g, RPC_C_AUTHN_LEVEL_CONNECT). The object 962 is defined in the catalog as part of a second application (e.g., a browser plug in) from a second developer; the minimum authentication level for the second application has been set to none (i.e., RPC_C_AUTHN_LEVEL_NONE). In the example, the link between the two computers provides no level of authentication.

In the example, the catalog is configured to allow the two objects 956 and 958 to be called by a set of predefined users (i;e., a role or roles). The catalog further indicates that calls by any user are permitted to the other object 962. The object 962 provides additional functionality by calling a remote object 980 on a remote computer over the Internet to exchange information. Another catalog on the computer at which the object 980 resides indicates any user is permitted to call the object and indicates no authentication is required.

When invoked, the object 962 calls the object 980, providing it with a reference back to itself 962 (i.e., a callback). Even though the inter-computer connection provides no authentication, the call is allowed because the catalog requires no authentication. Upon finishing its processing, the remote object 980 then calls back to the object 962 over the Internet. Since the connection provides no authentication, no identity information is available about the calling user (i.e., the user is anonymous). Nevertheless, the call is allowed because calls with no authentication are permitted to the object 962.

If the object 962 then attempts to access some other object 958 in the same process on behalf of the remote object 980 (i.e., by impersonating the anonymous user by using its token), the call will fail. The token indicates an identity not accepted by the object 958, and the authentication level associated with the call by the anonymous user is too low.

In the example, the security framework checks the authentication level before checking role membership, so the call fails because the authentication level is too low. Alternatively, the role membership could be checked before checking the authentication level. In such a case, the call fails because the user is not a member of the roles permitted to access the object. In either case, access to the object 958 is not allowed. In this way, an intra-process security boundary 960 is provided around a group of objects (the object 962 in the example) within a process.

Grouping the objects into object contexts according to application is a useful strategy because it helps facilitate application composability. For example, a developer of a first application exercises control over the development process for the application; so the developer can tailor the objects in the application to respect a particular coherent security scheme. However, when the first application is subsequently merged with a second application into a single overall application (a process also called "composing applications"), the objects of the second application may operate without respecting the wishes of the first developer.

The ability to place a security boundary at cross-application intra-process calls enables the developer of the first application to maintain a coherent security scheme when the application is composed with another application from another developer. Further, the illustrated declarative security mechanism allows a developer to easily implement and modify a security scheme without modifying the logic inside the objects. Finally, since the boundary can be maintained without regard to whether the objects are in the same process, objects from two different applications can share a process while maintaining a coherent security scheme, saving computing resources.

Having described and illustrated the principles of our invention with reference to illustrated embodiments, it will be recognized that the illustrated embodiments can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa. In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto:

We claim:

1. A method for providing security services to a secured object residing in a process and called from a calling object residing in the process, the method comprising:

interposing security logic between the secured object and the calling object to monitor calls directed to the secured object;

responsive to a call directed to the secured object by the calling object, wherein an identity is associated with the call, automatically executing the security logic to evaluate the associated identity; and selectively blocking the call as a result of evaluating the associated identity with the security logic to enforce a security boundary between the calling object and the secured object.

2. A computer-readable medium having computer-executable instructions for performing the steps of claim 1.

3. The method of claim 1 wherein the blocking step further evaluates an authentication level to determine whether to block the call, the method further comprising:

determining an authentication level of the call, wherein the authentication level is indicative of confidence in the accuracy of the associated identity; and during the executing step, evaluating the authentication level with the security logic.

4. The method of claim 1 wherein the security logic compares the associated identity with a list of identities in a central store to determine whether to block the call, wherein the central store resides outside the secured object and is generated from settings specified through a graphical user interface.

5. The method of claim 1 wherein the security logic is a security policy invoked by a wrapper interposed between the calling object and the secured object when the secured object is instantiated.

6. The method of claim 1 wherein the security logic is a security policy invoked by a wrapper interposed between the calling object and the secured object when a reference to the secured object is unmarshaled.

7. The method of claim 1 wherein the call invokes a method on the secured object and the security logic compares the associated identity with a list of identities permitted to access the method to determine whether to block the call.

8. The method of claim 7 wherein calls by any identity are permitted to the calling object.

9. In a computer system executing a program in a process, wherein calls from the program are associated with an identity, a method of enforcing a security boundary within the process comprising:

maintaining a security settings store comprising security settings for a secured object executing in the process, the security settings indicative of which identities are authorized to access the secured object;

before allowing access to the secured object by the program, consulting the store with logic outside the secured object and outside the program to determine if the associated identity is authorized to access the secured object; and blocking access to the object with the logic if the store does not indicate the associated identity is authorized to access the object.

10. A computer-readable medium having computer-executable instructions for performing the steps of claim 9.

11. The method of claim 9 wherein the object is grouped with other objects into an application for deployment on a host computer system, the method further comprising:

at development time of the application, defining access to methods of the object in terms of logical classes of users;

at deployment time of the application, binding the logical classes of users to identities recognized by the host computer system to generate at least some of the security settings in the security settings store.

12. The method of claim 9 wherein the store indicates a minimum acceptable authentication level for the secured object;

a call to the secured object has an associated authentication level; and the blocking step blocks access to the secured object whenever the associated authentication level is insufficient to satisfy the minimum acceptable authentication level.

13. The method of claim 9 wherein the program accesses the secured object through an invoked interface to the object, the store comprises settings indicative of which identities are authorized to access particular interfaces to the secured object; and the blocking step blocks access to the object as a result of determining the store indicates the associated identity is not authorized to access the invoked interface to the object.

14. The method of claim 9 wherein the client program accesses the secured object through a called method of an interface to the object, the store comprises settings indicative of which identities are authorized to access particular methods of the secured object; and the blocking step blocks access to the object as a result of determining the store indicates the associated identity is not authorized to access the called method of the interface to the object.

15. The method of claim 9 further comprising:

placing a wrapper between the client program and the secured object to redirect calls to the secured object to the wrapper, wherein the blocking step is performed by the wrapper.

16. The method of claim 9 further comprising:

collecting at least some of the security settings in the store through a graphical interface depicting the secured object.

17. A method of enforcing a per-method security boundary within a process in a computer system, the method comprising:

maintaining at the computer system a central security settings store comprising security settings for a first secured object having a plurality of methods, the security settings indicative of which user identities are permitted to access the methods, wherein a first method of the methods has different security settings than a second method of the methods and at least some of the security settings in the security settings store are configurable using a graphical user interface depicting the first object and the first object's methods;

creating the first object in the process;

creating a second object in the process;

interposing a wrapper between the first object and the second object to redirect a second object's call to the first object to the wrapper, wherein the call is associated with a user identity;

upon receiving the call to the first object, invoking a security policy with the wrapper to perform a security check upon receiving the call, wherein the security check comprises consulting the security settings; store to determine if the user identity associated with the second object is permitted to access the first object; and as a result of the security check choosing between forwarding the call to the first object if the security settings store indicates the user identity is permitted to access the first object and blocking the call if the security settings store indicates the user identity is not permitted to access the first object.

18. An object-based security framework for providing a security boundary between a secured object executing in a process and a program calling the secured object, wherein the program is executing in the process and calls from the program are associated with an identity, the security framework comprising:

a store for maintaining security settings indicative of an authorized set of identities authorized to call the secured object;

a wrapper operative to selectively forward calls to the secured object and further operative to invoke logic for monitoring calls to the secured object to enforce an intra-process security boundary between the secured object and the program by consulting the store to block calls to the secured object from the calling program if the associated identity is not in the authorized set of identities authorized to call the secured object;

an activator operative to execute responsive to a request to create the secured object and interpose the wrapper between the program and the secured object to redirect calls to the secured object to the wrapper.

19. The framework of claim 18 wherein the wrapper is a lightweight wrapper operative to perform security functions without performing marshaling of parameters other than interface pointers.

20. The framework of claim 18 wherein calls to the secured object have an associated authentication level indicative of confidence in the identity's accuracy;

the central store comprises a minimum acceptable authentication level for the secured object; and the security policy blocks calls to the secured object from the calling program if the associated authentication level does not satisfy the minimum acceptable authentication level.

21. The framework of claim 18 wherein the activator is one of a plurality of activators in an activation chain, the activator invoked by an object activation service.

22. The framework of claim 18 wherein the security policy is a replaceable object employing a predefined interface convention for receiving events.

23. The framework of claim 18 wherein security boundaries are selectively placed between a first object and a second object whenever the first object and the second object are members of different applications.

24. A method of providing a requesting client program with a reference to an object of a requested class to enforce a security boundary between the client program and the object transparently to the client program and the object, wherein a call from the client program is associated with an identity, the method comprising:

instantiating an instance of an object of the requested class in a same process as the client program;

acquiring an interface to the instance of the object; and interposing a security policy between the client program and the interface of the object by providing the client program with a reference to a wrapper operative to invoke the security policy transparently to the client program, wherein the wrapper automatically invokes the security policy to selectively block calls to the interface based on the identity associated with the client program.

* * * * *

UNITED STATES PATENT AND TRADEMARK OFFICE
CERTIFICATE OF CORRECTION

PATENT NO. : 6,487,665 B1
DATED : November 26, 2002
INVENTOR(S) : Andrews et al.

It is certified that error appears in the above-identified patent and that said Letters Patent is hereby corrected as shown below:

<u>Title page,</u>
Item [56], OTHER PUBLICATIONS, "Implementation Model for an "Activatable" ..." reference, "pp. 1-2, Dec. 1997." should read -- pp. 1-12, Dec. 1997. --. and "Ser. No. 9071594," should read -- Ser. No. 09/071,594, --.

<u>Column 12,</u>
Line 56, "Appld1" should read -- AppId1 --.

<u>Column 16,</u>
Line 42, "logical; threads" should read -- logical threads --.

<u>Column 17,</u>
Line 24, "i;e" should read -- i.e. --.

<u>Column 20,</u>
Line 37, "settings; store" should read -- settings store --.

Signed and Sealed this

First Day of July, 2003

JAMES E. ROGAN
*Director of the United States Patent and Trademark Office*